US012093882B2

(12) United States Patent
Scharaswak et al.

(10) Patent No.: US 12,093,882 B2
(45) Date of Patent: Sep. 17, 2024

(54) VEHICLE FLEET CONTROL SYSTEMS AND METHODS

(71) Applicant: RYDER INTEGRATED LOGISTICS, INC., Miami, FL (US)

(72) Inventors: Christopher Lee Scharaswak, Brighton, MI (US); Michael Alan Dupre', Colleyville, TX (US); William Landon Taylor, Burns, TN (US); Donald William Showell, Laurenceville, GA (US)

(73) Assignee: RYDER INTEGRATED LOGISTICS, INC., Miami, FL (US)

( * ) Notice: Subject to any disclaimer, the term of this patent is extended or adjusted under 35 U.S.C. 154(b) by 0 days.

(21) Appl. No.: 17/348,689

(22) Filed: Jun. 15, 2021

(65) Prior Publication Data
US 2021/0383321 A1 Dec. 9, 2021

Related U.S. Application Data

(60) Division of application No. 15/184,965, filed on Jun. 16, 2016, now Pat. No. 11,107,031, which is a
(Continued)

(51) Int. Cl.
*G06Q 10/08* (2024.01)
*G06Q 10/0835* (2023.01)
*G06Q 50/40* (2024.01)

(52) U.S. Cl.
CPC ......... *G06Q 10/0835* (2013.01); *G06Q 50/40* (2024.01)

(58) Field of Classification Search
CPC .. G06Q 30/0206; G06Q 10/06; G06Q 10/083; G06Q 10/087; G06Q 20/085;
(Continued)

(56) References Cited

U.S. PATENT DOCUMENTS

| 4,404,639 A | 9/1983 | McGuire et al. |
| 5,432,904 A | 7/1995 | Wong |

(Continued)

FOREIGN PATENT DOCUMENTS

| WO | WO-2010/002034 A1 | 1/2010 |
| WO | WO-2016/077677 A1 | 5/2016 |

OTHER PUBLICATIONS

Saunders, Lance W., John E. Bell, and Rapinder Sawhney "Rupy". "The use of Common Carriers to Control Internal Capacity: A Survey of the Industry." Transportation Journal 54.1 (2015): 122(14). ProQuest. Web. Apr. 2, 2024 (Year: 2015).*

(Continued)

*Primary Examiner* — Michael P Harrington
(74) *Attorney, Agent, or Firm* — BAKERHOSTETLER

(57) ABSTRACT

Systems and methods for control of a vehicle fleet system are provided. A disclosed vehicle fleet system includes a dedicated fleet control system for operating a dedicated carrier fleet having dedicated carrier vehicles. The dedicated fleet control system may be in communication with a common carrier control system of a common carrier fleet and may operate to assign various shipments among the dedicated carrier vehicles and the common carrier fleet. In particular, the dedicated fleet control system may selectively assign the one or more shipments to the dedicated fleet or the common carrier fleet based on dedicated carrier constraints and common carrier constraints. The constraints may be based on information received in part from an operator device communicatively coupled to the communication circuitry disposed in the respective vehicle, including an amount time that a driver has been operating the respective vehicle.

16 Claims, 11 Drawing Sheets

Related U.S. Application Data continuation-in-part of application No. 14/625,573, filed on Feb. 18, 2015, now abandoned.

(58) Field of Classification Search
CPC ............... G06Q 30/0201; G06Q 30/08; G06Q 10/0633; G06Q 10/08; G06Q 10/0834; G06Q 10/08345; G06Q 10/0835
See application file for complete search history.

(56) References Cited

U.S. PATENT DOCUMENTS

| | | | |
|---|---|---|---|
| 7,356,393 | B1 | 4/2008 | Schlatre et al. |
| 7,711,602 | B2 | 5/2010 | Kroswek et al. |
| 7,765,120 | B2 | 7/2010 | Yadappanavar et al. |
| 8,046,319 | B2 | 10/2011 | Satir et al. |
| 8,140,411 | B2 | 3/2012 | Staats |
| 8,195,496 | B2 | 6/2012 | Gottlieb et al. |
| 8,626,540 | B2 | 1/2014 | Peterkofsky et al. |
| 9,324,198 | B2 | 4/2016 | Davidson et al. |
| 2002/0019759 | A1 | 2/2002 | Arunapuram et al. |
| 2002/0069216 | A1 | 6/2002 | Bates |
| 2002/0111836 | A1 | 8/2002 | Uegaki |
| 2003/0050810 | A1 | 3/2003 | Larkin |
| 2003/0163332 | A1 | 8/2003 | Podgurny et al. |
| 2004/0167833 | A1 | 8/2004 | Schickler |
| 2005/0071247 | A1 | 3/2005 | Kelley et al. |
| 2005/0114194 | A1 | 5/2005 | Pandit |
| 2006/0184434 | A1 | 8/2006 | Schickler |
| 2006/0195348 | A1 | 8/2006 | Peterkofsky et al. |
| 2006/0241822 | A1 | 10/2006 | Yadappanavar et al. |
| 2011/0130962 | A1* | 6/2011 | Lindsey .................. G06Q 50/28 701/533 |
| 2012/0036072 | A1 | 2/2012 | Riggs et al. |
| 2012/0158608 | A1* | 6/2012 | Arunapuram ...... G06Q 10/0834 705/334 |
| 2012/0297337 | A1 | 11/2012 | St. Denis et al. |
| 2013/0096973 | A1 | 4/2013 | LaVoie et al. |
| 2013/0317861 | A1 | 11/2013 | Tofte et al. |
| 2014/0122187 | A1* | 5/2014 | Warkentin .......... G06Q 10/0833 705/7.38 |
| 2014/0365393 | A1* | 12/2014 | Taylor .............. G06Q 10/08345 705/335 |
| 2015/0051941 | A1 | 2/2015 | Bell |
| 2015/0161698 | A1* | 6/2015 | Jones ................. G06Q 30/0611 705/26.4 |
| 2015/0213402 | A1 | 7/2015 | Stroner et al. |
| 2016/0239800 | A1 | 8/2016 | Scharaswak et al. |
| 2016/0307155 | A1* | 10/2016 | Bell ....................... G06Q 10/08 |

OTHER PUBLICATIONS

Mexican Office Action from Mexican Patent Application No. MX/A/2017/010639, dated Dec. 8, 2022, 17 pages including English language summary.

3M HighJump, "The Five Key Ways Transportation Management Systems Can Rapidly Reduce Costs by up to 30 Percent," 2005.

Bolduc, et al., "A heuristic for the routing and carrier selection problem," European Journal of Operational Research, 2007, vol. 183, pp. 926-932.

Cote, et al., "A tabu search heuristic for the vehicle routing problem with private fleet and common carrier," European Journal of Operational Research, 2009, vol. 198, pp. 464-469.

Panchalavarapu, "What's the best design for your dedicated fleet?" Supply Chain Quarterly, 2010, downloaded from http://www.supplychainquartlery.com/topics/logistics/scq201001dedicated/.

Caplice, et al., "Optimization Based Procurement for Transportion Services," May 2011, downloaded from http://www.chainalytics.com/wp-content/uploads/2011/02/2003-02-Optimization-Based-Procurement-For-Transportation-Services-Journal-of-Business-Logistics-Chris-Caplice-and-Yossi-Sheffi.pdf.

International Search Report and Written Opinion from PCT/US2017/036878, dated Aug. 21, 2017, 10 pages.

Bolduc, et al., "A tabu search heuristic for the split delivery vehicle routing problem with production and demand calendars," European Journal of Operational Research, 2010, vol. 202, pp. 122-130.

Han, "Truckload Carrier Selection, Routing and Cost Optimization," Masters Thesis, University of Tennessee, Knoxville, Dec. 2015, 89 pages, retrieved from https://pdfs.semanticscholar.org/1194/d2e93ab335c70fbc51eae88cc90b5.pdf.

Li, et al., "Real-time vehicle rerouting problems with time windows," European Journal of Operational Research, 2009, vol. 194, pp. 711-727.

Liu, et al., "Task selection and routing problems in collaborative truckload transportation," Transportation Research Part E, 2010, vol. 46, pp. 1071-1085.

Ziebuhr, et al., "Solving an integrated operational transportation planning problem with forwarding limitations," Transportation Research Part E, 2016, vol. 87, pp. 149-166.

Extended European Search Report from European Patent Application No. 17813851.7, dated Jan. 28, 2020, 10 pages.

Nandiraju, S. (2006). Strategic freight transportation contract procurement (3209306). Available from ProQuest Dissertations and Theses Professional. (305372196). Retrieved from https://dialog.proquest.com/professional/docview/305372196?accountid=131444 (Year: 2006).

Figliozzi, M. A. (2004). Performance and analysis of spot truck-load procurement markets using sequential auctions (3123996). Available from ProQuest Dissertations and Theses Professional. (305175880). Retrieved from https://dialog.proquest.com/professional/docview/305175880?accountid= 131444 (Year: 2004).

Chang, et al., "Real-Time Vehicle Routing Problem with Time Windows and Simultaneous Delivery/Pickup demands," Journal of the Eastern Asia Society for Transportation Studies, Oct. 2003, 14 pages.

Canadian Office Action from Canadian Patent Application No. 3,027,875, dated Jul. 13, 2023, 5 pages.

Mexican Office Action from Mexican Patent Application No. MX/a/2021/012498, dated Apr. 24, 2024, 15 pages including English language summary.

Canadian Office Action from Canadian Patent Application No. 3,027,875, dated May 10, 2024, 4 pages.

* cited by examiner

300 — IDENTIFY, BY A DEDICATED FLEET CONTROL SERVER, ONE OR MORE SHIPMENTS FOR ASSIGNMENT TO AT LEAST ONE COMMON CARRIER VEHICLE IN A COMMON CARRIER FLEET OR AT LEAST ONE DEDICATED VEHICLE IN A DEDICATED CARRIER FLEET, THE DEDICATED FLEET CONTROL SERVER AND THE AT LEAST ONE DEDICATED VEHICLE BEING OPERATED BY A DEDICATED CARRIER

302 — RECEIVE, BY THE DEDICATED FLEET CONTROL SERVER FROM A COMMON CARRIER FLEET SERVER, A PLURALITY OF COMMON CARRIER CONSTRAINTS THAT INCLUDE AN INDICATION OF AT LEAST ONE AVAILABLE COMMON CARRIER VEHICLE IN THE COMMON CARRIER VEHICLE FLEET FOR ONE OR MORE PREDETERMINED WINDOWS OF TIME, AND COMMON CARRIER COSTS FOR SHIPPING THE ONE OR MORE SHIPMENTS WITH THE AT LEAST ONE AVAILABLE COMMON CARRIER VEHICLE ALONG ONE OR MORE ROUTES IN A DISTRIBUTION NETWORK OF THE COMMON CARRIER FLEET DURING THE ONE OR MORE PREDETERMINED WINDOWS OF TIME

304 — RECEIVE, BY THE DEDICATED FLEET CONTROL SERVER, VEHICLE STATUS INFORMATION FROM COMMUNICATIONS CIRCUITRY DISPOSED IN ONE OR MORE VEHICLES OF THE DEDICATED VEHICLE FLEET FOR THE ONE OR MORE PREDETERMINED WINDOWS OF TIME

306 — DETERMINE, BY THE DEDICATED FLEET CONTROL SERVER IN REAL TIME WHILE RECEIVING THE VEHICLE STATUS INFORMATION, ONE OR MORE DEDICATED CARRIER CONSTRAINTS ASSOCIATED WITH THE DEDICATED CARRIER FLEET, AT LEAST ONE OF THE ONE OR MORE DEDICATED CARRIER CONSTRAINTS BEING DETERMINED BASED ON THE RECEIVED VEHICLE STATUS INFORMATION

308 — SELECTIVELY ASSIGN, BY THE DEDICATED FLEET CONTROL SERVER, THE ONE OR MORE SHIPMENTS TO THE DEDICATED CARRIER FLEET OR THE COMMON CARRIER FLEET BASED ON THE DETERMINED ONE OR MORE DEDICATED CARRIER CONSTRAINTS AND THE RECEIVED PLURALITY OF COMMON CARRIER CONSTRAINTS

FIG. 3

600 — DISTRIBUTE LOADS AMONG A DEDICATED FLEET AND A COMMON CARRIER BY SIMULTANEOUSLY DETERMINING ROUTES FOR THE DEDICATED FLEET AND MINIMIZING AN OVERALL COST OF THE RESULTING DISTRIBUTION BASED ON ROUTING CONSTRAINTS, COMMON CARRIER INFORMATION, AND A COST MODEL THAT EXCLUDES FIXED COSTS FOR THE DEDICATED FLEET OVER A PERIOD OF TIME

602 — DETERMINE A MAXIMUM NUMBER OF DEDICATED FLEET VEHICLES USED ON ONE DAY WITHIN THE PERIOD OF TIME

604 — MODIFY THE NUMBER OF VEHICLES IN THE DEDICATED FLEET BASED ON THE DETERMINED MAXIMUM NUMBER

FIG. 6

700 — OBTAIN KNOWN OR EXPECTED LOAD INFORMATION, DEDICATED FLEET INFORMATION, DEDICATED FLEET DRIVER INFORMATION, ROUTING CONSTRAINTS, AND COMMON CARRIER INFORMATION FOR A PROJECTED PERIOD OF TIME

702 — DETERMINE A PLANNED DISTRIBUTION OF THE KNOWN OR EXPECTED LOADS OVER THE PROJECTED PERIOD OF TIME AMONG A DEDICATED FLEET AND A COMMON CARRIER BY SIMULTANEOUSLY DETERMINING ROUTES FOR THE DEDICATED FLEET AND MINIMIZING AN OVERALL COST OF THE RESULTING DISTRIBUTION BASED ON ROUTING CONSTRAINTS, COMMON CARRIER INFORMATION, AND A COST MODEL THAT INCLUDES FIXED COSTS FOR THE DEDICATED FLEET

704 — DETERMINE A MAXIMUM NUMBER OF DEDICATED FLEET VEHICLES PROJECTED TO BE USED IN ONE DAY WITHIN THE PROJECTED PERIOD OF TIME

706 — MODIFY THE NUMBER OF VEHICLES IN THE DEDICATED FLEET BASED ON THE DETERMINED MAXIMUM NUMBER

FIG. 7

VEHICLE FLEET CONTROL SYSTEMS AND METHODS

The present application claims the benefit of priority under 35 U.S.C. § 120 as a divisional of U.S. patent application Ser. No. 15/184,965 entitled "Vehicle Fleet Control Systems and Methods," filed on Jun. 16, 2016, which is a continuation-in-part of U.S. patent application Ser. No. 14/625,573 entitled "Transportation Network Optimization," filed on Feb. 18, 2015, the disclosures of which are hereby incorporated by reference in their entirety for all purposes.

BACKGROUND

The present disclosure relates generally to vehicle systems and particularly to vehicle fleet control.

SUMMARY

The disclosed subject matter relates to systems and methods of efficient control of distributed systems of vehicles.

In some implementations, a method is provided that includes identifying, by a dedicated fleet control server operated by a dedicated carrier, one or more shipments for assignment to a common carrier fleet or a dedicated carrier fleet; receiving, by the dedicated fleet control server from a common carrier fleet server, a plurality of common carrier constraints including an indication of at least one available common carrier vehicle for one or more predetermined windows of time, and costs for shipping the one or more shipments with the at least one available common carrier vehicle along one or more routes during the one or more predetermined windows of time; receiving, by the dedicated fleet control server, vehicle status information from communications circuitry disposed in one or more vehicles of the dedicated carrier fleet; determining, by the dedicated fleet control server in real time while receiving the vehicle status information, one or more dedicated carrier constraints for the one or more predetermined windows of time based on the received vehicle status information; and selectively assigning, by the dedicated fleet control server, the one or more shipments to the dedicated carrier fleet or the common carrier fleet based on the determined one or more dedicated carrier constraints and the received plurality of common carrier constraints.

In other implementations, a system is provided that includes a dedicated carrier fleet with a first plurality of vehicles; and a dedicated fleet control system communicatively coupled to each of the first plurality of vehicles and in communication with at least one common carrier control system, where the dedicated fleet control system is configured to: receive real-time vehicle and driver status information from communications circuitry for each of the first plurality of vehicles; receive real-time availability information for a second plurality of vehicles operated by a common carrier from the common carrier control system for one or more windows of time; determine a plurality of dedicated carrier constraints based, at least in part, on the real-time vehicle and driver status information; and distribute a plurality of shipments among the first plurality of vehicles and the second plurality of vehicles for transportation of the plurality of shipments from respective pickup locations to respective delivery locations within the one or more windows of time based on a determination of routes for the first plurality of vehicles made in real time with a concurrent minimization of an overall cost of a resulting distribution using the received real-time availability information and the plurality of dedicated carrier constraints.

In other implementations, a method is provided that includes distributing, using a dedicated fleet server, a plurality of loads among a dedicated carrier fleet and a common carrier vehicle fleet, for delivery of the plurality of loads from respective pickup locations to respective delivery locations, based on a determination of routes for one or more first vehicles of the dedicated carrier fleet and a minimization, simultaneous with the determination of routes, of an overall cost of the resulting distribution based on dedicated carrier constraints, common carrier constraints for one or more second vehicles of the common carrier vehicle fleet, and a cost model that excludes fixed costs for the dedicated carrier fleet, where at least one of the dedicated carrier constraints is determined in real time during the distributing of the plurality of loads, based on vehicle status information received by the dedicated fleet server from communications circuitry disposed in at least one vehicle of the dedicated carrier fleet, where the dedicated carrier constraints include a constraint that each of the plurality of loads be picked up from a corresponding pickup location for that load and delivered to a corresponding delivery location for that load within a window of time, and where the common carrier constraints include an indication of a number of available common carrier vehicles and common carrier costs for the window of time and one or more routes associated with at least one of the plurality of loads.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the accompanying figures summarized below.

FIG. 3 is a flow diagram of an example process that may be performed for shipment distribution and vehicle fleet control in implementations of the subject technology using the system of FIG. 1.

FIG. 6 is a flow diagram of an example process that may be performed for fleet sizing in some implementations of the subject technology using the system of FIG. 1.

FIG. 7 is a flow diagram of an example process that may be performed for fleet sizing in some implementations of the subject technology using the system of FIG. 1.

DETAILED DESCRIPTION

Figure 1:
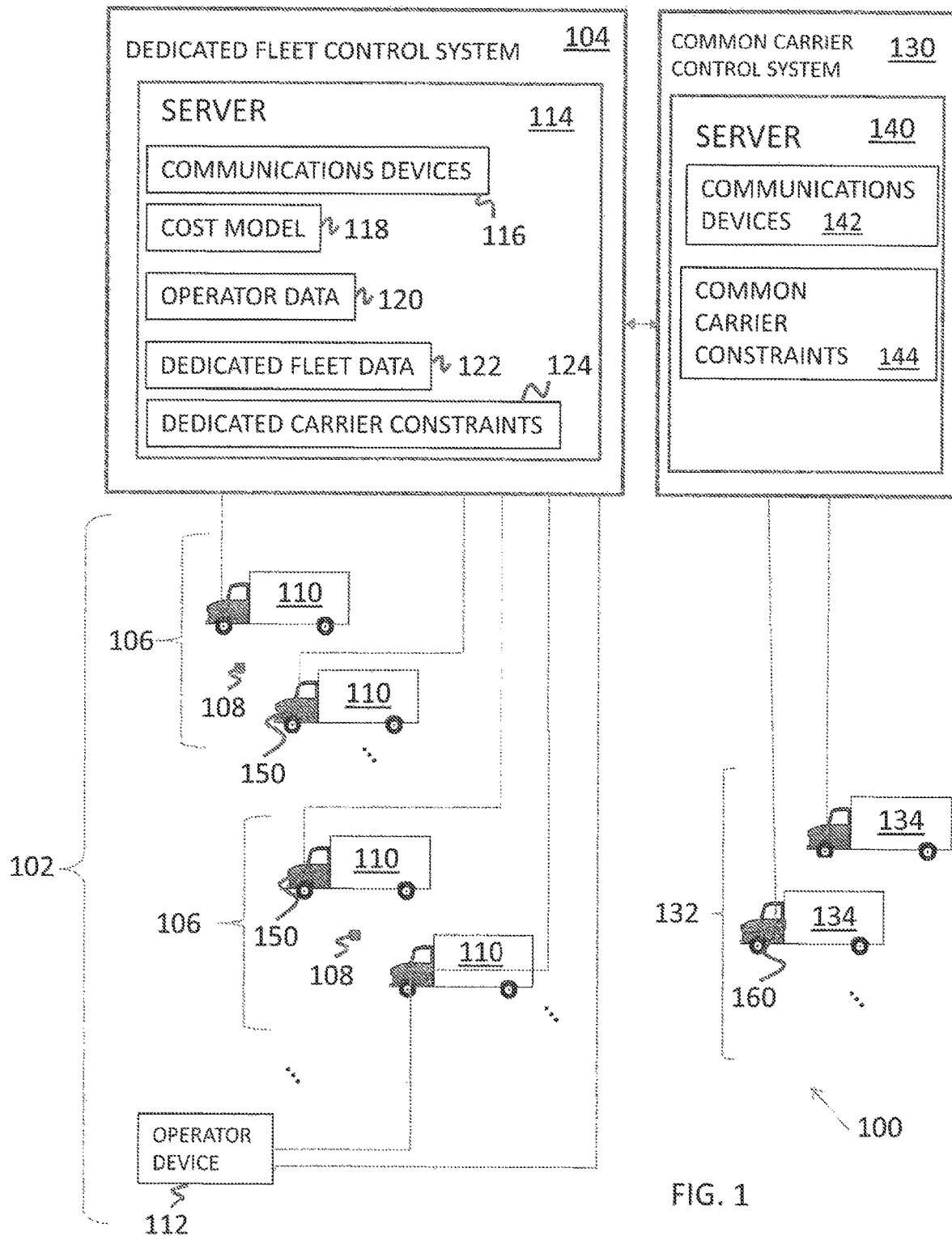
FIG. 1 is a diagram of an example vehicle fleet system for practicing some implementations of the subject technology.

The detailed description set forth below is intended as a description of various configurations of the subject technology and is not intended to represent the only configurations in which the subject technology may be practiced. The appended drawings are incorporated herein and constitute a part of the detailed description. The subject technology is not limited to the specific details set forth herein and may be practiced without these specific details.

The disclosed implementations discussed herein provide systems and methods for assigning shipments between a dedicated carrier fleet and a common carrier fleet in such a way that takes into consideration relevant fleet constraints and leverages the benefit of real-time fleet parameters (e.g., real-time data received at a carrier server from communications circuitry installed in each fleet vehicle).

A dedicated carrier fleet is a fleet of vehicles that are dedicated to or owned by a dedicated carrier organization. The dedicated fleet may be allocated by a dedicated fleet control system, at least for a period of time, for pickup and delivery of shipments for the dedicated carrier organization. Dedicated fleet vehicles may each be associated with a home depot from which they depart and to which they return (e.g., within a period of time such as each day). A dedicated fleet controller or dedicated fleet control system may, for example, be a local, regional, or global transportation organization that manages one or more dedicated fleets for other organizations such as shippers or other corporations.

A common carrier fleet may be a third-party shipper that accepts shipping orders from any of various shippers (e.g., on demand). A common carrier fleet can sometimes be used to supplement existing private and dedicated vehicle fleets.

The effective and efficient utilization of transportation assets is a fundamental building block of sound supply chain management practice. In the logistics domain, trucking challenges such as fuel costs, driver shortages, increased customer service requirements, industry capacity issues, rising insurance costs, heightened government regulations, and elevated environmental standards have increased the sense of urgency of transportation providers as they seek to maintain performance. In some scenarios, common (e.g., third-party) carriers can be used to supplement existing private and dedicated vehicle fleets (i.e., resources "dedicated" to an organization, at least for a period of time, and managed by a dedicated fleet controller). This strategy of utilizing a mix of dedicated and common carrier resources can allow shippers to obtain the benefits often attributed to private and/or dedicated fleets (sometimes referred to herein as assigned resources), while still retaining the ability to manage fluctuations in demand by using common carrier resources.

However, while cost can be reduced by using a common carrier fleet in combination with a dedicated vehicle fleet, how and when to utilize a common carrier are often not purely cost-related decisions. Instead, shippers may desire to evaluate strategic, tactical, and operational factors from both a direct and indirect perspective when determining a shipping plan. Some advantages of private and/or dedicated fleets are the increase in customer service from assigned resources, higher quality, increased control, and more flexibility. Accordingly, a more comprehensive total cost of ownership perspective is provided herein that incorporates multiple decision factors in assigning shipments between dedicated fleets and common carrier fleets.

Regardless of the transportation strategy chosen, if assigned resources are part of that strategy, the organization may not attain enough resources to handle all shipments due to the negative asset utilization impact of potential unused capacity during off-peak periods. Additionally, common carriers can offer a lower cost for certain routes such that it may not be as economical to operate assigned fleet assets on those particular routes. Thus, one tactical decision that may be addressed is what shipments to designate to assigned fleet resources versus those that can be assigned to common carriers. In some aspects, shipment assignments are made using cost models that are based on both direct fixed and variable costs. However, assignments based on cost models that include fixed costs can result in low utilization of assigned resources relative to carrier preference, if care is not taken.

Thus, in other aspects, manual intervention is performed in which qualitative decision factors such as route preference and perceived quality are used to modify automated assignments (e.g., to increase utilization of dedicated vehicles). However, manual intervention can decrease the efficiency with which shipments are routed to various vehicles and can also prevent an optimal distribution of shipments from being made due to the complexity and speed of simultaneously (or concurrently) receiving vehicle and driver information from various geographically distributed vehicle communications systems and client (shipper) systems, integrating the received information into a cost model and routing constraints, and minimizing the overall shipping cost for a shipper while meeting various cost, asset, legal, and human related constraints.

Accordingly, the subject technology provides a method that includes identifying, by a dedicated fleet control server, one or more shipments for assignment to at least one common carrier vehicle in a common carrier fleet or at least one dedicated vehicle in a dedicated carrier fleet. The dedicated fleet control server and the at least one dedicated vehicle may be operated by a dedicated carrier. The method may also include receiving, by the dedicated fleet control server from a common carrier fleet server, a plurality of common carrier constraints that include an indication of at least one available common carrier vehicle in the common carrier fleet for one or more predetermined windows of time, and common carrier costs for shipping the one or more shipments with the at least one available common carrier vehicle along one or more routes in a distribution network of the common carrier fleet during the one or more predetermined windows of time. The method may also include receiving, by the dedicated fleet control server, vehicle status information from communications circuitry disposed in one or more vehicles of the dedicated carrier fleet for the one or more predetermined windows of time. The method may also include determining, by the dedicated fleet control server in real time while receiving the vehicle status information, one or more dedicated carrier constraints associated with the dedicated carrier fleet. At least one of the one or more dedicated carrier constraints may be determined based on the received vehicle status information. The method may also include selectively assigning, by the dedicated fleet control server, the one or more shipments to the dedicated carrier fleet or the common carrier fleet based on the determined one or more dedicated carrier constraints and the received plurality of common carrier constraints.

In various implementations, communicatively interconnected systems of vehicles, common carrier servers, dedicated carrier servers, client devices, and vehicle operator devices are provided herein that employ an optimization model that addresses, for the first time in a single objective model, the decision of how to assign loads and routes between dedicated assets and common carriers, thereby providing a more efficient shipping system that can be implemented to move goods on a local, regional, state-wide, nation-wide, multi-national, and/or global scale.

A transportation organization, such as a dedicated carrier may use the dedicated fleet control system of the subject technology to allocate truck, trailer, and/or other vehicle capacity as a dedicated fleet to dedicated customers based on historical shipment data. Dedicated resources (e.g., each dedicated fleet vehicle) may be re-allocated periodically and/or in real time among various managed dedicated fleets (e.g., approximately every three months or quarterly, every six months, every month, etc.), with the goal of dedicating enough resources to each customer to ensure satisfactory service levels without over-assigning resources such that asset utilization suffers. A dedicated fleet controller may assign, or re-assign in real time, some shipments to a common carrier in addition to an assigned/dedicated fleet in order to supplement dedicated resources that are assigned to a customer, as well as to take advantage of any situations in which the cost of common carriers makes them the best cost alternative.

The dedicated fleet control system of the subject technology may generate shipment assignments based, at least in part, on factors such as driver working hours constraints or constraints that require each vehicle to return to its home depot within a period of time (e.g., each day). More specifically, assignment systems and methods based on direct route costs for each shipment, may be supplemented by other factors or constraints such as timeliness of deliveries (e.g., customer service), the ability to return dedicated fleet drivers to their home depot at the end of each shift, the backhaul probability of each route (e.g., to reduce empty or less-that-full miles travelled on return routes), maximizing the utilization of dedicated assets (e.g., reducing or minimizing idle time and less-than-full miles for each vehicle of a dedicated fleet), and/or other real-time information such as vehicle mechanical issues (e.g., mechanical problems that can arise at any time), safety issues, fuel prices, oil prices, highway conditions such as traffic conditions and associated delays and/or road work or conditions and associated delays, accidents, etc.

The real-time data to be considered for shipping assignments can be widely distributed (e.g., data from tens, hundreds, or thousands of individual vehicles distributed over several square miles, tens of square miles, hundreds of square miles, millions of square miles, etc., and/or data from traffic information servers, market servers such as oil market servers, government and regulatory agency servers, repair facility servers dedicated carrier servers, common carrier servers, etc.). Some or all of this real-time data may also be constantly changing responsive to changing prices, conditions and/or events. It would therefore be impossible for any human being, or group of human beings, to manually generate shipping assignments that meet the varied and evolving constraints based on varied and evolving data, while minimizing costs and preventing under-utilization of dedicated assets, before some or all of the data upon which the manual assignments were based changes to become potentially obsolete and/or irrelevant to current conditions.

As noted above, even the time required for manual modifications to previously computed computer-generated of shipping assignments can be too slow to account for all of the competing constraints in shipment assignments and to account for real-time information available (e.g., from communications circuitry in each vehicle and/or other sources as noted above).

Systems and methods are thus provided that integrate real-time assignment operations into a single decision model that more efficiently and effectively allocate and assign resources to various routes with various carriers in real time and without human intervention in a time frame that would be physically impossible for a human being or a group of human beings to perform before the data on which the decisions are made becomes obsolete.

FIG. 1 is a diagram showing a networked system of vehicles including a dedicated vehicle fleet and a common carrier fleet. As shown in FIG. 1, system 100 may include a dedicated fleet 102 and a common carrier fleet 132. Dedicated fleet 102 may be operated by a dedicated fleet control system 104. Common carrier fleet 132 may be operated by a common carrier control system 130. In various implementations, a control system may operate a vehicle fleet by assigning shipments among the vehicles (e.g. using any or all of the route assignment and cost optimization operations described herein), transmitting a travel route such as a daily route to each vehicle, receiving and monitoring status information from each vehicle, making real-time adjustments to shipping assignments and routes based on the received status information, and/or tracking shipment pickups and deliveries by each vehicle (as examples). In some implementations, the control system may transmit a travel route such as a daily route (e.g., in GPS coordinates) to a GPS guidance system in the vehicle that provides turn-by-turn directions for a driver of the vehicle. In other implementations, the control system may transmit a travel route such as a daily route (e.g., in GPS coordinates) to a GPS guidance system in a self-driving vehicle that self-navigates the travel route.

As shown in FIG. 1, dedicated fleet 102 may include a plurality of dedicated fleet vehicles 110. Each dedicated fleet vehicle 110 may be associated with a home depot 108 such that each home depot 108 serves a group 106 of dedicated fleet vehicles 110. Dedicated fleet vehicles 110 may be operated by dedicated fleet control system 104 such that each dedicated fleet vehicle 110 departs from, and returns to, its home depot 108 within a period of time (e.g., each day, each week, etc.). In this way, operators such as drivers of each dedicated fleet vehicle may be provided with an enhanced lifestyle that avoids overnight or other extended trips away from home.

Each dedicated fleet vehicle 110 may be in communication with dedicated fleet control system 104. For example, each dedicated fleet vehicle 110 may have communications circuitry 150 included therein that communicates with a server such as server 114 of dedicated fleet control system 104. Communications between communications circuitry 150 of each dedicated fleet vehicle 110 and server 114 may include status information provided from the vehicle to server 114 and/or shipment assignment instructions provided from server 114 to the vehicle (as examples).

Status information provided from the vehicle may include vehicle location information (e.g., global positioning system (GPS) coordinates), vehicle hours of operation information, driver working time or hours of service information, driver available hours of service information, fuel level information, maintenance information, an identifier of a home depot, shipment status information, and/or other status information for the vehicle and/or the driver of the vehicle, discussed further below.

Vehicle location information may include continuously or periodically reported global positioning system (GPS) coordinates that allow server 114 to track the movements of each vehicle 110. The vehicle location information may also, or alternatively, include an identifier of a pickup location or a delivery location at which the vehicle is located (e.g., during loading or unloading of shipments). The identifier of the pickup location or the delivery location may include an address of the location, GPS coordinates of the location, or a numerical identifier of the location that corresponds to an account stored at server 114 in connection with other location information such as a company name, a contact number or method, or other information associated with the location.

Vehicle hours of operation information may include a real-time updated amount of time since the vehicle departed it's home depot, an amount of time since the vehicle departed a pickup location or a delivery location, a total number of hours during which the vehicle has been operated within a particular time window such as during one day, during one week, during one month, during, one season, or during one year (as examples).

Driver working time or hours of service information may include an amount of time since a driver of the vehicle entered the vehicle, an amount of time since the driver of the vehicle departed a home depot, a pickup location or a delivery location, a total number of hours during which the driver has been operating the vehicle within a particular time window such as during one day, during one week, during one month, during one season, or during one year (as examples). Driver working time or hours of service information may include a real-time current working hours total that is continuously updated throughout each shift.

Driver available hours of service information may include a real-time updated amount of time before a driver of the vehicle hits a driving time limit such as a regulatory limit. A regulatory limit may be set by the control system 104, or may be received by the control system from a government, union, or other agency.

Fuel level information may include a real-time updated amount of fuel in one or more fuel tanks of each vehicle. The amount of fuel may be determined by electronic fuel sensors that form a portion of a vehicle computing system for each vehicle.

Real-time maintenance information may include a maintenance reminder for the vehicle or a maintenance alert for the vehicle. A vehicle maintenance reminder may include, for example, a service due reminder for one or more services. Services may include an oil change or inspection, a belt change or inspection, a brake fluid change or inspection, a brake pad change or inspection, a transmission fluid change or inspection, and/or a tire rotation, change or inspection (as examples). A vehicle maintenance alert may include a driver-detected or automatically-detected problem with the vehicle. For example, an automated tire-pressure monitor may determine that one or more of the vehicle's tires are low on air or have lost air pressure. Responsively, communications circuitry 150 in that vehicle may send an alert to communications devices 116 that the vehicle's tires are low on air or have lost air pressure. In other examples, communications circuitry 150 may provide vehicle maintenance alerts or other alerts to communications devices 116 related to events such as an air-bag-sensor-detected air bag deployment, an accelerometer or pressure-sensor-detected collision, a fuel-sensor-detected fuel leak or other vehicle-sensor-detected events.

The identifier of the home depot for a vehicle may include an address of the home depot, GPS coordinates of the home depot, or a numerical identifier of the home depot that is stored at server 114 in connection with other home depot information.

Shipment status information may include a real-time updated pick-up status, a real-time updated delivery status, or a real-time updated location of each shipment carried by a particular vehicle. The real-time updated pick-up status may include an indicator of whether the shipment has been picked up. The real-time updated delivery status may include an indicator of whether the shipment has been delivered.

The foregoing and other real-time updated values that may be reported by the vehicle communications circuitry may be updated, for example, every minute, every ten minutes, every hour, several times per minute, several times per second, hundreds of times per second, thousands of times per second, etc.

Assignment instructions provided from server 114 to communications circuitry 150 of each vehicle 110 may include one or more travel routes such as daily routes for that vehicle. The travel routes may be stored at the vehicle and may, for example, be automatically imported by the vehicle computing system into a mapping device that provides visual and/or audio directions to a driver of the vehicle for navigating the travel routes.

Server 114 of dedicated fleet control system 104 may receive shipment orders from a customer to which control system 104 has dedicated a fleet 102. Server 114 may, based on various factors, constraints, and operations described in further detail hereinafter, automatically and in real time, assign the shipments for pickup and/or delivery to one or more of dedicated fleet vehicles 110 and/or to common carrier vehicles 134.

As shown in FIG. 1, common carrier fleet 132 may include one or more common carrier vehicles 134. Common carrier vehicles 134 may, optionally include communications circuitry 160 for communication with common carrier control system 130 (e.g., with server 140 via communications devices 142). Communications circuitry 160 of common carrier vehicles 134 may perform some or all of the functions described above in connection with communications circuitry 150 of dedicated fleet vehicles 110. For example, communications circuitry 160 of common carrier vehicles 134 may provide location information and/or other vehicle and/or driver status information as described herein for each vehicle 134 to server 140. Server 140 may generate one or more common carrier constraints for common carrier vehicles 134 (e.g., in real time) based on the received common carrier vehicle and/or driver status information received from communications circuitry 160 and may provide the generated common carrier constraints (e.g., in real time) to server 114 for route and/or carrier assignment operations. However, this is merely illustrative. In other implementations, communications circuitry 160 may provide vehicle and/or status information for common carrier vehicles 134 directly to server 114 and server 114 may generate and apply some or all of the common carrier constrains at server 114.

Communications devices 142 of server 140 may be operated by server 140 for communications with common carrier vehicles 134 and/or communications with server 114 (e.g., via communications devices 116 of server 114). For example, common carrier control system 130 may provide common carrier constraints 144 to dedicated fleet control system 104. Server 114 may use the provided common carrier constraints 144 in assigning shipments for delivery between the dedicated fleet 102 and the common carrier fleet 132. Although dedicated carrier server 114 and common carrier server 130 of FIG. 1 are each shown as a single server, in various implementations dedicated fleet control system 104 and/or common carrier control system 130 may each store and provide access to data on multiple networked dedicated carrier servers and/or multiple networked common carrier servers. Additionally, dedicated carrier server 114 and/or common carrier server 140 may exchange and/or retrieve real-time data for shipping assignments from one or more outside servers such as traffic information servers, highway conditions servers, GPS system servers, market servers such as oil market servers, or other networked information sources for incorporation into shipping assignment operations.

Common carrier constraints 144 may include an indication of a number of available common carrier vehicles 134 in the common carrier vehicle feet 132 (e.g., for one or more windows of time such as for one day, a portion of a day, multiple days, one week, one month, one quarter, or the like). common carrier costs for specific routes in a distribution network for the common carrier fleet, and/or common carrier costs for shipping one or more shipments with the available common carrier vehicles along specific routes in a distribution network of the common carrier fleet during one or more predetermined windows of time (as examples).

Communications devices 116 of server 114 may be operated for communications with communications circuitry 150 of dedicated fleet vehicles 110, with server 140, with other external systems (e.g., traffic systems, weather reporting systems, law enforcement systems, or other systems), and/or with operator devices such as operator device 112.

Operator device 112 may be, for example, a mobile phone, a smart phone, a tablet, a portable digital assistant, a pager, a tablet, or a laptop. Operator device 112 may be carried by an operator such as a driver of a vehicle 110 during and/or after working hours and may be in communications with communications circuitry 150 of a vehicle 110 and/or with dedicated fleet control system 104 as shown in FIG. 1. In some implementations, operator device 112 may communicate with server 114 via communications circuitry 150. For example, operator device 112 may be communicatively coupled to communications circuitry 150 (e.g., via a wired or wireless connection) while the operator device is located within the cab of the vehicle. Communications such as shipment assignment and route instructions may be provided from server 114 to communications circuitry 150 over a network such as a cellular data network or the Internet and then communicated from communications circuitry 150 to operator device 112. Delivery reporting information, pickup reporting information, driver identity information, and/or other information may be entered into operator device 112 by the driver and, when device 112 is communicatively coupled to communications circuitry 150, uploaded to server 114 via communications circuitry 150. However, this is merely illustrative. In other implementations, operator device 112 may communicate with server 114 over a network such as a cellular data network or the Internet without intervening communication with communications circuitry 150.

In some implementations, server 114, server 140, communications circuitry 150 of vehicles 110, operator device 112, and/or communications circuitry 160 of vehicles 134 can communicate with one another via a network such as the Internet, an intranet, a local area network, a wide area network, a wired network, a cellular communications network, a wireless network, or a virtual private network (VPN) in various scenarios and implementations.

In one example, operator device 112 may communicate with communications circuitry 150 of a vehicle 110 (e.g., via near field communications, Bluetooth® communications, or other wired or wireless communications) when operator device 112 is within a proximity (e.g., in the cab) of a vehicle 110. Once operator device 112 and vehicle 110 are coupled in this way, vehicle and driver status may be reported to server 114 (e.g., periodically, continuously, or in response to events such as delivery, pickup, or working time threshold events). For example, in order to prevent a particular driver from operating a vehicle longer than allowed by law (or by other standards) in a day, driver working time and/or driver current available hours may be reported to server 114 and used by server 114 in allocating shipments between dedicated fleet 102 and common carrier fleet 132.

As shown in FIG. 1, server 114 may store and/or generate information to be used for assigning shipments between dedicated fleet 102 and common carrier fleet 132 such as a cost model 118 (e.g., a mathematical description, implemented in software and configurable based on real-time real-world data such as status information from vehicles 110 and/or common carrier constraints 144), operator data 120 (e.g., stored and/or real-time driver working time and/or driver current available hours for one or more windows of time), dedicated fleet data 122 (e.g., a number of vehicles 110 in dedicated fleet 102, a maintenance status of each vehicle, a fuel level of each vehicle, a maximum range of each vehicle, a capacity of each vehicle, a home depot of each vehicle, etc.), and one or more dedicated carrier constraints 124. Operator data 120, dedicated fleet data 122, and/or dedicated carrier constraints 124 may be continuously, periodically, or otherwise updated (e.g., in real time) based on data received from vehicles 110. Dedicated carrier constraints 124, as discussed in further detail hereinafter, may be predetermined or may be generated by server 114 (e.g., in real time based, in part, on status information from communications circuitry 150).

Although examples are described herein in which a driver operates each vehicle, this is merely illustrative. In some implementations, communications circuitry 150 may be coupled with operational circuitry for the vehicle such that operation of the vehicle is controlled by the vehicle itself according to instructions (e.g., delivery and pickup instructions for one or more shipments) from server 114.

Although FIG. 1 shows an example of a system in which dedicated fleet control system 104 operates a single dedicated fleet 102, this is merely illustrative. In other implementations, dedicated fleet control system 104 may operate more than one dedicated fleet, each fleet dedicated to a particular customer or shipper. In order to efficiently use dedicated fleet vehicles, the dedicated fleet vehicles may be reassigned (e.g., periodically such as once per month, once per quarter, twice per year, once per year, or in response to a change in customer demand or other factors). Reassignment of dedicated fleet vehicles 110 may include moving one or more dedicated fleet vehicles 110 from one dedicated fleet (e.g., dedicated fleet 102) to another dedicated fleet that is dedicated, by control system 104 to an organization or client that is different from the organization or client to which dedicated fleet 102 is assigned, may include adding additional (e.g., newly purchased) vehicles to a dedicated fleet, or permanently removing one or more vehicles from all dedicated fleets (e.g., by selling or donating the vehicle(s)).

Figure 2:
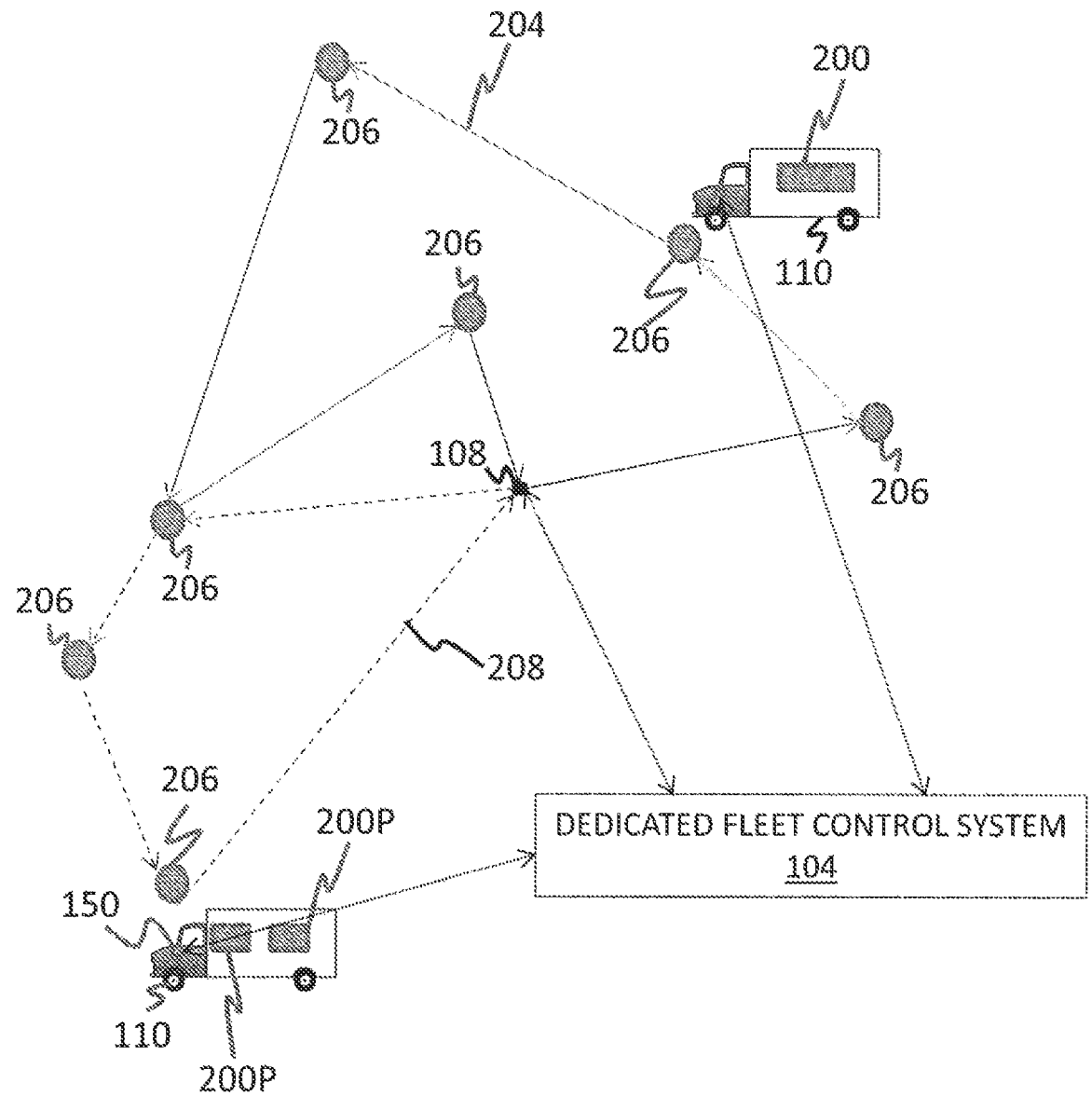
FIG. 2 is a diagram of exemplary vehicle routes for dedicated fleet vehicles having a common home depot in accordance with some implementations of the subject technology

FIG. 2 shows a diagram of two exemplary routes for two corresponding dedicated fleet vehicles 110, each associated with a common home depot 108. As shown in FIG. 2, a first vehicle 110 may operate to carry a load 200 (e.g., a load containing one or more individual shipments) along a route 204 that includes various nodes 206. Each node 206 may be a pickup and/or delivery location for one or more shipments in the load 200. As shown, route 204 begins and ends at home depot 108.

A second vehicle 110 may be operated to carry another load (e.g., a load including two shipments 200P) along another route 208 that includes various nodes 206. As shown in the particular example of FIG. 2, routes 204 and 208 include one common node 206 and a plurality of different nodes 206. Routes for each vehicle 110 may be determined in a simultaneous operation with the assignment of shipments among vehicles 110 and common carrier fleet 132. The simultaneous route determination and assignment of shipments may be performed using the cost model 118, the operator data 120, the dedicated fleet data 122, the common carrier constraints 144, real-time data from vehicles 110, and/or various dedicated vehicle constraints as described herein.

As shown in FIG. 2, while traversing route 204, dedicated fleet vehicle 110 may transmit vehicle and/or driver status information to dedicated fleet control system 104. For example, dedicated fleet vehicle 110 may continuously report its location, may report arrival and/or departure times for each node 206 and/or home depot 108, and/or may report other vehicle and driver status information as described herein to control system 104.

For example, when vehicle 110 leaves home depot 108, a home depot departure notification may be transmitted from communications circuitry 150 to dedicated fleet control system 104. While travelling from home depot 108 to a first node 206, communications circuitry 150 may continuously or periodically report location information to dedicated fleet control system 104. Upon arrival at a first node 206, communications circuitry 150 may transmit an arrival notification for that node. If that node is a pickup node, when load 200 is loaded into vehicle 110, communications circuitry 150 may transmit a pickup time notification to dedicated fleet control system 104. While travelling from pickup node 206 to a delivery node 206, communications circuitry 150 may continuously or periodically report location information to dedicated fleet control system 104. Upon arrival at a second node 206, communications circuitry 150 may transmit an arrival notification for that node. If that node is a delivery node 206 for some or all of load 200, when some or all of load 200 is unloaded from vehicle 110, communications circuitry 150 may transmit a delivery time notification to dedicated fleet control system 104. Upon return to home depot 108, communications circuitry 150 may transmit a home depot return notification. In some implementations, routing for vehicle 110 may be determined, in part, based on a backhaul constraint that increases the likelihood that vehicle 110 will carry a load from a last node 206 to home depot 108 and/or from a second to last node 206 to a last node 206 (as examples) such that trip from the furthest node 206 back toward home depot 108 carries at least a partial load. As shown in FIG. 2, home depot 108 may also be in electronic communication with dedicated fleet control system 104 and may exchange other information for reporting of vehicle, driver, and/or load information.

FIG. 3 depicts a flow diagram of an example process for selectively assigning shipments (e.g., shipment orders received from a client device) between a dedicated carrier and a common carrier, according to various aspects of the subject technology. For explanatory purposes, the various blocks of the example process of FIG. 3 are described herein with reference to the components and/or processes described herein. One or more of the blocks of the example process of FIG. 3 may be implemented, for example, by one or more processors without user intervention, including, for example, server 114 of FIG. 1 or one or more components or processors of server 114. In some implementations, one or more of the blocks may be implemented apart from other blocks, and by one or more different processors or controllers. Further for explanatory purposes, the blocks of the example process of FIG. 3 are described as occurring in serial, or linearly. However, multiple blocks of the example process of FIG. 3 may occur in parallel. In addition, the blocks of the example process of FIG. 3 need not be performed in the order shown and/or one or more of the blocks of the example process of FIG. 3 need not be performed.

In the depicted example, at block 300, a dedicated fleet control server such as server 114 of FIG. 1 may identify one or more shipments assigned to, or for assignment to, at least one common carrier vehicle 134 in a common carrier fleet 132 and/or at least one dedicated vehicle 110 in a dedicated carrier fleet (dedicated fleet) 102, the dedicated fleet control server 114 and the at least one dedicated vehicle 110 being operated by a dedicated carrier 102. For example, a shipment order containing pickup and delivery instructions for one or more shipments for an organization to which dedicated fleet 102 is dedicated may be received.

At block 302, the dedicated fleet control server 114 may receive, from a common carrier fleet server 140, a plurality of common carrier constraints 144. For example, server 140 may determine a number of (e.g., at least one) available common carrier vehicles and costs associated with the operation of those vehicles (e.g., in real time based on availability) and may provide real-time common carrier constraints, including a cost per vehicle, a cost per route, a cost per weight, a cost per distance, and/or a number of available vehicles to server 114. In one particular example, the common carrier constraints may include an indication of a number of available common carrier vehicles in the common carrier vehicle fleet 132 for one or more predetermined windows of time, and common carrier costs for shipping the one or more shipments with the available common carrier vehicles 134 along specific routes in a distribution network of the common carrier fleet 132 during the one or more predetermined windows of time. A window of time may include a day, a week, a month, a quarter, a season, or other suitable period of time. The common carrier constraints 144 may be constantly changing and thus may be provided with sufficient frequency that server 114 can, in real time during shipping assignment operations, incorporate any changes in the common carrier constraints.

At block 304, the dedicated fleet control server 114 may receive vehicle status information from communications circuitry 150 disposed in each vehicle 110 of the dedicated carrier fleet 102 for the one or more predetermined windows of time. The vehicle status information may be constantly changing (e.g., due to changing positions of the vehicles of the fleet, changing shipment status information, changing traffic or other highway conditions, maintenance or mechanical issues, etc. that occur before, during, and after delivery operations) and thus may be provided with sufficient frequency that server 114 can, in real time during shipping assignment operations, incorporate any changes in the vehicle status information.

At block 306, the dedicated fleet control server 114 may determine, in real time while receiving the vehicle status information, one or more dedicated carrier constraints associated with the dedicated carrier fleet 102. At least one of the dedicated carrier constraints may be determined based on the received vehicle status information. Because the vehicle status information may be constantly changing, dedicated carrier constraints may be constantly updated in real time during shipping assignment operations. For example, server 114 may receive a real-time current working hours total from a dedicated fleet vehicle 110 for a driver of that vehicle 110. Server 114 may determine, based on the real-time current working hours total, a remaining available hours total for the driver (e.g., an available working hours value for the driver). Server 114 may then generate a dedicated carrier constraint that prevents assigning any shipments to the driver that would cause the driver to work beyond the remaining available hours total to complete the deliveries.

At block 308, dedicated fleet control server 114 may selectively assign the one or more shipments to the dedicated fleet 102 or the common carrier fleet 132 based on the determined dedicated carrier constraints and the received common carrier constraints. The one or more shipments may be assigned in real time as constraints are received or calculated (e.g., calculated in real time during the selective assignment based on constantly changing data from distributed components of the system such as vehicles and various networked servers). In this way, the utilization of the dedicated fleet vehicles 110 can be set at a desirable level while minimizing costs using the common carrier fleet 132, and while ensuring dedicated fleet vehicle maintenance, home depot consistency, and driver safety, all before the data upon which the selective assignment is based becomes obsolete. Various examples of selective assignment operations are provided below.

In one implementation, the operations of block 306 may include, for example, receiving a real-time current working hours total from a dedicated fleet vehicle 110 for a driver of that vehicle while performing the operations of block 308. In this example, the operations of block 308 may include not selecting the driver for any of the one or more shipments if the dedicated carrier constraint that prevents assigning the one or more shipments for the driver within the one or more predetermined windows of time that cause the driver to work beyond the remaining available hours total is not satisfied. The remaining hours total may be determined by server 114 to be a difference between a working hours maximum (e.g., 8 hours, 12 hours, or 14 hours) and the current working hours total. In some implementations, the operations of block 308 may include assigning a shipment to a common carrier fleet based on not selecting the driver. In some implementations, the shipment may be assigned to another driver of the dedicated vehicle fleet.

In one implementation, vehicle status information for each vehicle 110 of the dedicated vehicle fleet 102 may include a real-time remaining available driving hours value for a driver of that vehicle 110 within the one or more predetermined windows of time, and the operations of block 308 may include selecting only dedicated vehicle fleet drivers with real-time available driving hours values that satisfy a predetermined threshold (e.g., that are greater than a driving hours threshold).

As another example, the vehicle status information for a particular dedicated fleet vehicle 110 may include a maintenance notice for that vehicle 110 during one or the one or more predetermined windows of time and the operations of block 308 may include preventing assignment of shipments to that vehicle 110 during the one or more predetermined windows of time until the maintenance notice is cleared. A shipment scheduled for that vehicle 110 during the window of time may be assigned to a common carrier fleet 132 or the shipment may be assigned to another dedicated fleet vehicle 110 of the dedicated vehicle fleet 102.

As another example, the vehicle status information for a particular dedicated fleet vehicle 110 may include an identifier of a home depot 108 for that vehicle, and the operations of block 306 may include generating a constraint that causes a route for that vehicle 110 to begin and end at the identified home depot 108.

Once the selective assignments are complete, a shipment plan may be generated or updated by the dedicated fleet control server 114 based on the selective assignment. The shipment plan may include a route for each dedicated fleet vehicle to be operated and an assignment either to a dedicated fleet vehicle 110 or a common carrier 132 for each shipment. The shipment plan may be implemented as a group of data fields pertaining to one or more shipments. The shipment plan may be stored at the dedicated fleet server 114.

A portion of the shipment plan (e.g., a list of shipments to be made by the common carrier fleet) may be provided (e.g., transmitted electronically from server 114 to server 140) to the common carrier fleet server 140 for distribution of a first portion of the one or more shipments to the common carrier fleet.

Assignments from a second portion of the shipping plan for a second portion of the one or more shipments may be provided by the dedicated fleet control server 114 to the communications circuitry 150 of at least some of the vehicles 110 of the dedicated fleet 102. For example, a travel route (e.g., a daily route) such as one of routes 204 or 208 of FIG. 2, with shipping pickup and delivery instructions (e.g., instructions noting each node 206 on the route) may be pushed from the dedicated fleet control server 114 to each dedicated fleet vehicle 110 before pickup and delivery operations for that vehicle are started. The travel route may be stored by a computing system of each vehicle or transmitted by or accessible from a server to be provided to the driver of the vehicle (e.g., as turn-by-turn directions with a map and shipment instructions for each shipment) or for autonomous execution by a driverless vehicle. One or more travel routes may be provided to each vehicle each day, each week, each month, each quarter, each season, at any other suitable time. For example, the travel routes 204/208 may be daily routes that are updated from the server 114 to vehicles 110 one or more times during each delivery day.

In another example, the travel routes 204/208 may be provided from the dedicated fleet control server 114 to an operator device 112. The travel routes 204/208 may be provided to the vehicle 110 from the operator device 112 when the operator device is within a proximity (e.g., within range of short-range communications circuitry) of the vehicle 110. For example, the travel routes 204/208 may be loaded on the operator device 112 and automatically downloaded to the vehicle 110 when the driver enters the vehicle so that directions (e.g., turn-by-turn directions) can be generated for the driver to help the driver timely pickup and deliver all assigned shipments.

Figure 4:
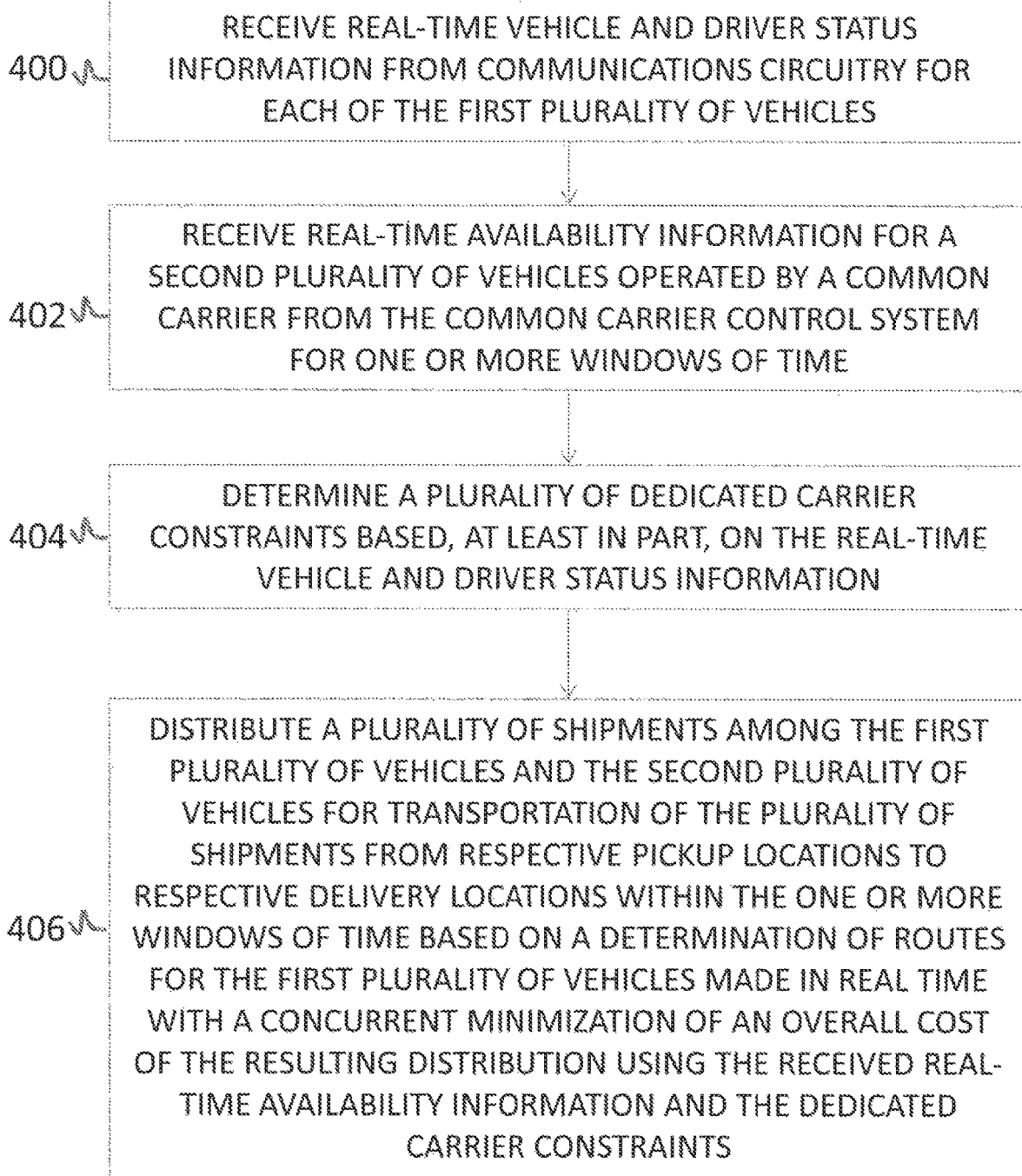
FIG. 4 is a flow diagram of another example process that may be performed for shipment distribution and vehicle fleet control in implementations of the subject technology using the system of FIG. 1.

FIG. 4 depicts a flow diagram of another example process for selectively assigning shipments (e.g., shipment orders received from a client device) between a dedicated carrier and a common carrier, according to various aspects of the subject technology. For explanatory purposes, the various blocks of the example process of FIG. 4 are described herein with reference to the components and/or processes described herein. The one or more of the blocks of the example process of FIG. 4 may be implemented, for example, by one or more processors, including, for example, server 114 of FIG. 1 or one or more components or processors of server 114. In some implementations, one or more of the blocks may be implemented apart from other blocks, and by one or more different processors or controllers. Further for explanatory purposes, the blocks of the example process of FIG. 4 are described as occurring in serial, or linearly. However, multiple blocks of the example process of FIG. 4 may occur in parallel. In addition, the blocks of the example process of FIG. 4 need not be performed in the order shown and/or one or more of the blocks of the example process of FIG. 4 need not be performed.

In particular, in one implementation, the operations described below in connection with FIG. 4 may be performed by a system to operate a dedicated carrier fleet 102 that includes a first plurality of vehicles (e.g., dedicated fleet vehicles 110). The system may include a database of common carrier constraints associated with at least one common carrier fleet (e.g., common carrier fleet 132) that may have a second plurality of vehicles (e.g., common carrier vehicles 134). The system may include a dedicated fleet control system (e.g., system 104) communicatively coupled to each of the first plurality of vehicles and in communication with at least one external routing system (e.g., common carrier control system 130) for the second plurality of vehicles.

In the depicted example, dedicated fleet control system 104 may be configured to receive, at block 400, real-time vehicle and driver status information from communications circuitry 150 for each of the first plurality of vehicles 110 (e.g., real-time location information, working hours information, fuel level information, maintenance information, pickup and/or delivery information etc.).

Dedicated fleet control system 104 may receive, at block 402, real-time availability information for a second plurality of vehicles operated by a common carrier from the common carrier control system for one or more windows of time.

Dedicated fleet control system 104 may determine, at block 404, a plurality of dedicated carrier constraints based, at least in part, on the real-time vehicle and driver status information and, at block 406, distribute a plurality of shipments among the first plurality of vehicles 110 and the second plurality of vehicles 134 for transportation of the plurality of shipments from respective pickup locations to respective delivery locations within the one or more windows of time based on a determination of routes such as routes 204 and 208 of FIG. 2 for the first plurality of vehicles 110 made in real time with a concurrent minimization of an overall cost of a resulting distribution using the received real-time availability information and the dedicated carrier constraints.

The database of common carrier constraints may be a remote database operated by dedicated fleet control system 104, a local database (e.g., storage of server 114 of FIG. 1) operated by dedicated fleet control system 104, or a remote database of a common carrier control system 130. The common carrier control system 130 may provide, at various times, the common carrier constraints to the dedicated fleet control system 104. For example, common carrier control 130 system may provide the common carrier constraints to dedicated fleet control system 104 each day (e.g., each morning), more than once per day (e.g., twice per day, three times per day, or continuously or nearly continuously), each week, each month, each quarter, each year, or may provide the common carrier constraints responsive to an event such as a request from dedicated fleet control system 104, a change in the common carrier fleet 132, and/or a change or update to the constraints. In this way, server 114 can be provided with and incorporate real-time updated common carrier information (and/or other real-time information) to distribute a plurality of shipments among various dedicated carrier vehicles 110 and common carrier vehicles 134 in a way that would be impossible to perform by a human being before the common carrier information (and/or other real-time information) changes sufficiently to affect the resulting distribution.

In some implementations, the concurrent minimization of the overall cost of the resulting distribution includes a minimization based on a cost model (see, e.g., Model 1 discussed hereinafter) that excludes fixed costs for the first plurality of vehicles 110, as described in further detail hereinafter.

For example, the minimization based on the cost model that excludes fixed costs for the first plurality of vehicles 110 may include a minimization of a sum of a selection factor multiplied by a travel cost for each of the first plurality of vehicles 110 and each of the second plurality of vehicles 134 for travel between each pickup location and each delivery location, as described in further detail hereinafter.

In some implementations, the dedicated carrier constraints include a time window constraint that ensures each of the plurality of shipments is picked up from its pickup location and delivered to its delivery location within a time window. The time window may correspond to a maximum allowable time difference between a pickup time and a delivery time.

In some implementations, the time window constraint may include a flexibility factor applied to the maximum allowable time difference between the pickup time and the delivery time. The flexibility factor may, for example, be a user-specified variability in the maximum allowable time difference that facilitates a reduction in size for the dedicated carrier fleet 102.

In some implementations, the dedicated carrier constraints include an empty-miles constraint and a less-than-full-miles constraint that, in combination, reduce a number of determined routes that include portions in which any vehicle of the dedicated carrier fleet 102 travels with less than a full load such that miles travelled less than full for each of the first plurality of vehicles 110 satisfies a predetermined threshold (e.g., is less than a less-than-full threshold). For example, an empty-miles constraint may be implemented in part by applying a weighting factor that discourages routes 204/208 for a dedicated fleet vehicle 110 that include a route portion in which the vehicle 110 is empty. For example, a less-than-full-miles constraint may be implemented in part by applying a weighting factor that discourages routes 204/208 for a dedicated fleet vehicle 110 that include a portion in which the vehicle 110 is not full to its capacity.

In some implementations, each of the first plurality of vehicles 110 is associated with a home depot 108, the status information includes at least an identifier of the home depot 108 for each of the first plurality of vehicles, and the dedicated carrier constraints include a constraint that each of the first plurality of vehicles 110 depart from and return to its respective home depot 108 at a predetermined time or within a predetermined time window. For example, the home depot constraint may be a constraint that ensures that each dedicated fleet vehicle 110 departs from and returns to its respective home depot 108 at a predetermined time (e.g., each day).

A backhaul probability may be a probability of a vehicle carrying cargo on a return journey from a delivery location. In some implementations, the dedicated carrier constraints include a backhaul probability constraint that modifies the resulting distribution such that a number of empty return routes for the first plurality of vehicles 110 satisfies a predetermined threshold (e.g., is below an empty backhaul threshold). The backhaul probability constraint may be implemented, in some examples, as an increased or decreased empty-miles constraint applied to route portions in the direction of the home depot 108.

In some implementations, the vehicle and driver status information for each vehicle 110 and driver includes a current available driving hours value for a driver of that vehicle 110, and the operations of block 308 above may include selecting dedicated vehicle fleet drivers with current available driving hours values that satisfy a predetermined threshold (e.g., that are greater than an available working hours threshold).

In various implementations, assignment of shipments among dedicated carrier fleets and common carrier fleets may include, at least in part, a cost minimization operation. The cost minimization operation may be based on a cost model that provides an estimate of the resulting cost of the dedicated versus common carrier assignments and may, according to various implementations, have a dependence on direct costs, which may include the fixed cost of assigned assets.

Although cost may be important in some implementations, other factors such as time sensitivity, returning drivers to their home depot, and utilization of dedicated fleet resources may also be important. Additionally, in some implementations, fixed costs may be already established until the next (e.g., quarterly) reallocation cycle, which may reduce the effect of direct costs in the daily decision process for assignment of shipments.

Accordingly, in some cost models (see, e.g., Model 1 described hereinafter), fixed costs are excluded so as not to allow these factors to be prioritized and included in the assignment between dedicated and common carriers. In this way, time-efficient and cost-efficient assignment operations can be performed using a single-objective analytical model that incorporates all of the relevant factors that influence the assigned resource versus common carrier resource assignment and routing operations.

As described herein, a vehicle routing operation (VRO) may be an operation in which shipping needs for a number of customers or clients are routed to be served by a fleet of vehicles. Vehicle routing operations may be performed, in various implementations using constraints such as pickup and delivery time window constraints, constraints that increase the likelihood of backhauls (e.g., loads carried by a vehicle on a return trip), and/or other pickup and delivery constraints that help determine routes for transport demand between pickup and delivery locations.

For example, in some circumstances, pickups and deliveries may be constrained to be performed, based on customer requests or requirements, within a time window. In this case, for example, a client may require that each load has to be carried in a specific timeframe from a pickup location to a delivery location. A vehicle control system as described herein may generate and apply constraints to ensure the client's requests are satisfied. To provide additional flexibility, and potential cost savings, in some scenarios, shipments may be distributed among a dedicated fleet and one or more common carrier fleet(s). A vehicle control system implemented by a dedicated fleet control system is described herein that allows comparison of dedicated assets versus common carrier resources for specific routes in a distribution network in order to make the best assignment and routing decision using a single model.

In some implementations, a dedicated fleet control system such as dedicated fleet control system 104 of FIG. 1 may perform simultaneous route assignment and cost optimization operations using an example optimization model, labeled Model 1, that will now be described in connection with, for example, Tables 1 and 2 and FIG. 5. In particular, Table 1 below presents various terms that may be used in an example of an optimization model for simultaneous route assignment and cost optimization. In the Model 1 implementation, a new cost structure is utilized in the objective function of the model, and additional practical constraints are also applied to allow transportation providers to assign and route resources according to the decision factors that they value in practice.

In order to describe Model 1, three major sets are defined: nodes (see, e.g., nodes 206 of FIG. 2), loads (see, e.g., loads 200 of FIG. 2) and routes (see, e.g., routes 204 and 208 of FIG. 2). More particularly, in the Model 1 implementation, a first operation assigns a particular node 206 to be a home depot node for each dedicated fleet vehicle 110. Although the home depot is a single location, two nodes (a departing node and a returning node) are assigned to the home depot for computational convenience and efficiency. For example, the first of these nodes (node 1) assigned to the home depot is utilized as the departing node, and the second node is assigned to the same home depot as the returning node (node 2).

Two nodes 206, one for pickup and one for delivery also characterize each load (see, e.g., loads 200 and 200P of FIG. 2). In this case, two loads 200 with the same pickup and delivery locations, in this implementation, will have four nodes 206 instead of two.

TABLE 1

| | Nomenclature. |
|---|---|
| i, j, h | Node indexes |
| k | Vehicle number index |
| $c_{ijk}$ | Cost of traveling from node i to node j with truck k |
| $v = \{v_1, v_2\}$ | Set of all vehicles; $v_1$ the set of dedicated/private fleet and $v_2$ is a set with one member representing all common/global carriers. |
| NT | Number of utilized trucks |
| FC | Fixed cost |
| $TC_{ijk}$ | Travel cost from i to j for vehicle k |
| N | Set of nodes |
| $s_i$ | The time that node i has been visited by a vehicle $\forall i \notin N \{1, 2\}$ |
| $t_{ij}$ | Travel time from i to j |
| $tsw_{ij}$ | Service and wait time for dedicated vehicle at route (i, j) with lower bound of 30 minutes. |
| $w_{1k}, w_{2k}$ | The time that node 1 or 2 has been visited by the vehicle k |
| WT | Upper bound for working time, WT = 14 hours Working time is equal to all driving time, service time and waiting time between loads. |

TABLE 1-continued

Nomenclature.

| | |
|---|---|
| routes | Set of all valid routes with the form of (i, j) |
| | i is origin node and j is destination |
| loads | Set of all load routes with the form of (i, j) |
| | i is pickup node and j is delivery node |
| $x_{ijk} = \begin{cases} 1, \\ 0, \end{cases}$ | vehicle k goes through route (i, j) |
| | otherwise |

Routes 204/208 may each be referred to as a set of paired nodes 206 labeled as (i, j), which are used to define valid routes. In order to avoid unnecessary routes and decrease the number of variables, the following implementations of dedicated carrier constraints may be utilized for defining routes 204/208 in the Model 1 implementations:

There is no valid route 204/208 from a delivery node 206 to another delivery node 206

There is no route 204/208 from depot return node (node 2) to any other node 206

From each pick-up node 206 there is only one route 204/208 to its corresponding delivery node 206

As discussed above, in other implementations, routing assignments can sometimes be performed with a single carrier model (e.g., a private carrier, a dedicated carrier, or a common carrier), instead of a combination of carriers. In still other implementations, models that do allow selection of different types of carriers can be used and may utilize direct costs in determining routing and carrier assignments. In still other implementations, multi-objective or multi-criteria decision making methods may be utilized for multi-carrier selection processes to allow integration of other decision factors into the process.

However, in the Model 1 example, a particular cost model is provided that allows routing determinations and carrier assignments to be performed using a single objective model for carrier selection of routes. The objective of the Model 1 model is minimization of cost, and thus both dedicated asset and common carrier cost may be considered in an objective function, which may be implemented for computation as follows:

$$\text{Min} \sum_{k \in V: \{V_1, V_2\}} \sum_{i \in N} \sum_{j \in N} c_{ijk} x_{ijk} \quad \text{(Equation 1)}$$

Table 2 below is an overview of an assigned asset cost breakdown that may be used to determine costs within the Model 1 model. As shown, overall costs of dedicated assets in Table 2 are divided into three categories: fixed cost, travel fixed cost, and travel variable cost. Any or all of these costs may be calculated in real time based on, for example, real-time vehicle status information received from communications circuitry 150 of dedicated fleet vehicles 110 as discussed herein.

TABLE 2

Transportation cost components.

| Fixed cost | Travel cost-route cost | Travel cost-per mile |
|---|---|---|
| Equipment purchase (e.g., Truck, trailer, etc.) | Cost of road characteristics | Fuel consumption |
| Depreciation (e.g., salvage) | Number of stops | Driver (e.g., wage, benefits, etc.) |
| Maintenance and inspection Special permits License fees, insurance fees, etc. Management and overhead (e.g., Office space, office equipment, management salary and expenses, advertisement, communication, etc.) | Toll | Maintenance |

Fixed costs may consist of all overhead (e.g., management costs, office costs, etc.) and capital investment (e.g., truck purchase costs, required business licenses and permits costs, insurance costs, etc.). Some part of maintenance activities may actually be fixed. For example, an oil change is often scheduled based on mileage or time, whichever comes first. Time-based maintenance costs may thus be considered in the fixed costs.

Travel costs can be divided into route-dependent and mileage-dependent components. The route-dependent travel cost component may include costs such as road quality costs, traffic costs, toll costs, and an average number of stops cost. The mileage-dependent portion may consist of costs such as fuel consumption costs, some proportion of driver salary costs, and distance related maintenance costs like tire costs and belt change costs.

Fixed costs may be different from the other two categories. For example, fixed costs may be constant regardless of how many dedicated carrier vehicles are being utilized, particularly in systems that allocate dedicated fleet resources to customers on a periodic basis. Accordingly, fixed costs for a dedicated carrier fleet may not be avoidable, whether or not the dedicated fleet vehicles are used to move shipments, and can thus be excluded from comparison between assigned assets and common carriers on a tactical level. However, it should be noted that fixed costs may still be considered in fleet sizing decisions (described in further detail below in connection with, for example, FIGS. 6 and 7) for deciding how many internal (dedicated) resources to allocate across parts of the network (e.g., to various dedicated fleets for various customers). However, in the Model 1 example, the fleet size is set in advance of the daily assignment decision (e.g., at an earlier periodic asset allocation). The following Model 1 equations and related calculations may be used as part of a vehicle control system operation to help facilitate automated optimization using the fixed and variable costs described above in connection with Table 2.

Fixed cost, like any other cost element for a vehicle fleet, may be divided by the total number of vehicles (e.g., trucks) or traveled miles for the fleet. In this case, the cost associated with assigned (internal or dedicated) trucks will be:

$$c_{ijk} = \left(\frac{FC}{|v_1|} + TC_{ijk}\right) \quad k \in v_1 \quad \text{(Equation 2)}$$

where $|v_1|$ is total number of dedicated/private trucks.

A utilization element, u, may be defined that numerically describes daily truck utilization for Model 1. For example, one suitable definition of daily truck utilization is:

$$u = \frac{\text{Number of utilized trucks}}{|v_1|} \quad \text{(Equation 3)}$$

In this implementation, a dedicated carrier fleet controller may charge customers all travel costs and a portion of fixed costs such that the customer's overall cost can be determined numerically as follows:

$$\text{Customer's overall cost} = FC * u + \sum_{\forall i,j,k} (TC_{ijk} * x_{ijk}) \quad \text{(Equation 4)}$$

However, an unexpected hidden cost may be created when allocating the fixed costs in this manner, as the objective function only considers the actual number of vehicles utilized as part of fixed costs even though the fixed costs for all of the dedicated fleet vehicles are actually incurred given the periodic allocation process. Consequently the following unexpected part of the fixed costs are not considered in the above objective function:

$$\text{Hiddencost} = FC * (1-u) \quad \text{(Equation 5)}$$

In order to avoid unnecessarily and undesirably, underutilizing the dedicated fleet, the fixed costs may be divided by the number of utilized trucks instead of total trucks in order to capture all the relevant costs. Using the above nomenclature, a numerical value for the cost of each utilized truck k can be determined as follows:

$$\text{Assigned asset cost} = \frac{FC}{|v_1| * u} + \sum_{\forall i,j,k} (TC_{ijk} * x_{ijk}) \quad \text{(Equation 6)}$$

$$k \in V_1, (i, j) \in \text{routes}$$

Using the above operation to determine the cost of each utilized dedicated fleet truck, an improved objective function can be obtained that represents a more accurate total cost. However, the presence of a variable (i.e., the number of utilized trucks, u) in the denominator above makes the problem nonlinear. However, the overall summed cost of dedicated assets can be determined numerically as follows:

$$\sum_{k \in V:\{V_1\}} \sum_{i \in N} \sum_{j \in N} c_{ijk} x_{ijk} = \frac{FC}{|v_1| * u} * |v_1| * u + \sum_{\forall i,j,k} (TC_{ijk} * x_{ijk}) \quad \text{(Equation 7)}$$

The above shows that the denominator in first element may be canceled with $|v_1|*u$ and the remaining portion of the first term above will be fixed cost FC, which is constant. The following unexpected linear equation will thus be the resulting objective function for Model 1 in which fixed costs are excluded from the cost model and, a minimization of a sum of a selection factor ($x_{ijk}$) multiplied by a travel cost ($TC_{ijk}$) for each of the first plurality of vehicles and each of the second plurality of vehicles for travel between each pickup location and each delivery location is performed at the dedicated fleet control system 104 as follows:

$$\text{minimize} \sum_{\forall i,j,k} (TC_{ijk} * x_{ijk}) \quad \text{(Equation 8)}$$

The same unexpected result may be obtained by considering actual traveled miles instead of utilized assigned assets in the model formulation. Consequently, fixed cost may be excluded in the tactical decision making (e.g., assignments) between assigned assets and common carriers when using a periodic fleet allocation strategy in the Model 1 implementation.

The Model 1 implementation may be used to more accurately reflect the real-time decision factors used in practice in the dedicated fleet versus common carrier assignment operations. These assignment operations using the Model 1 implementation (and/or other cost model implementations) may be performed by a dedicated fleet control system 104 and may also utilize model constraints (e.g., dedicated carrier constraints) for assigning and routing the dedicated fleets, as will now be discussed. In other implementations, some or all of the dedicated carrier constraints discussed below can also be utilized with other cost models, if desired.

Some real-world constraints that are integrated in the Model 1 implementation and or other implementations for dedicated fleet vehicles 110, may not be taken into account for common carrier resources 134. Example differences of how constraints may be applied to dedicated versus common carrier resources are as follows:

Routing of common carriers 132 is not a point of interest. In various implementations, single load handling may be used for the common carrier without considering common carrier truck routing before picking up and after delivering a load.

It may be assumed that the common carriers 132 will take care of time window and maximum working hour regulations externally from the dedicated fleet control system 104.

Leaving from and returning to a home depot may not be a concern for common carrier resources.

Dedicated carrier constraints may include a fulfillment constraint that imposes that every order must fulfilled. In this way, dedicated fleet control system 104 may be prevented from generating any shipping plan (e.g., a plan that includes assignments for shipments among a dedicated fleet 102 and a common carrier fleet 132, along with routes 204/208 for the dedicated fleet 102) that leaves any shipment order unfulfilled. The fulfillment constraint may be implemented in the model as follows by constraining a sum, over all vehicles k in both the dedicated and common carrier fleets, of a selection factor, $x_{ijk}$, to be equal to one for all loads:

$$\sum_{k \in V:\{v_1,v_2\}} x_{ijk} = 1, \quad \forall (i, j) \in \text{loads} \quad \text{(Equation 9)}$$

Home depot departure and return constraints may also be applied that require that every dedicated fleet vehicle 110 must depart from its assigned home depot 108 (e.g., node 1 as departing node 206) and return to the same home depot 108 (e.g., node 2 as returning node 206). During assignment and routing operations, an unutilized dedicated fleet vehicle 110 may be represented by a vehicle having a route that includes travel from node 1 to 2, which means that truck has not left the home depot 108. Home depot departure and return constraints may be implemented in the model, respectively, as follows:

$$\sum_{k \in v_1} x_{ijk} = 1, \quad i = 1 \quad \text{(Equation 10)}$$

$$\sum_{k \in v_1} x_{ijk} = 1, \quad j = 2 \quad \text{(Equation 11)}$$

As shown, for the home depot departure constraint, a sum, over all dedicated carrier vehicles, of the selection factor, $x_{ijk}$, may be constrained to be equal to one for node 1. For the home depot return constraint, a sum, over all dedicated carrier vehicles, of the selection factor, $x_{ijk}$, may be constrained to be equal to one for node 2.

An additional constraint may prevent dedicated fleet vehicles from staying at any node 206 except for node 2 (i.e., the home depot 108) that is the final destination for all dedicated fleet vehicles 110. There are two types of routes addressed in this additional constraint, one route is coming to node j from node i and the other route has to leave node j to another node h. This additional constraint may be implemented numerically as a constraint that the difference over the following sums of selection factors, $x_{ijk}$, and $x_{jhk}$, is zero for all nodes and all dedicated fleet vehicles 110 as follows:

$$\sum_{i \in N \setminus 2} x_{ijk} - \sum_{h \in N} x_{jhk} = 0, \quad \forall h \in N, \forall k \in v_1 \quad \text{(Equation 12)}$$

A time window constraint may also be applied that ensures that all pickups and deliveries by dedicated fleet vehicles 110 are performed within a predetermined time window. For example, the time window constraint may be a constraint that the difference between the time that a dedicated fleet vehicle 110 visits a delivery node 206 is not later than pickup time at a pickup node 206 plus the drive time and service and wait time associated with the route between the pickup node and the delivery node, for all nodes except for the home depot. The time window constraint may be implemented numerically as follows (where M may be chosen to be a sufficiently large number that ensures that the inequality is satisfied on arcs where x is zero):

$$s_i + t_{ij} + tsw_{ij} - s_j - M(1 - x_{ijk}) \leq 0 \; \forall (i, j) \in \text{routes}, i \neq 1, j \neq 2$$
$$\text{and } k \in v_1 \quad \text{(Equation 13)}$$

In the Model 1 implementation, with the exception of the home depot 108 (e.g., described as both node 1 and node 2), each node 206 may be visited only once for each vehicle for each route, thus the above time window constraint works properly for all pickup and delivery nodes 206. However, home depot nodes 1 and 2 are the exceptions to this rule, and dedicated fleet vehicles may be allowed to follow routes that leave/arrive at these home depot nodes at different times within the time window, and thus a vehicle index for each of these two home depot nodes are provided, which are treated separately in a different constraint associated with a different time window (e.g., one day or one shift). In particular, home depot visit times can be recorded for current, past, or proposed routes for home depot nodes 1,2 respectively as $w_{1k}$, $w_{2k}$. During real-time vehicle routing and assignment operations, $w_{1k}$, $w_{2k}$ can be used to represent the home depot visit times for nodes 1 and 2 to allow these nodes to be visited multiple times within a delivery window without violating the above time window constraint.

Another group of dedicated carrier constraints not only accounts for travel, service and wait times, but also, when applied during vehicle routing and assignment operations, helps reduce or eliminate sub-tours for dedicated fleet vehicles 110 by assigning a time to each visited node 206. If a first node 206 is visited once by a dedicated fleet vehicle 110, then a time s will be assigned to that node and, after departure of the dedicated fleet vehicle 110 to another node 206, a positive travel time t will be added to that value s. Thus, a route that causes a dedicated fleet vehicle 110 to return to the same node 206 will cause a contradiction that violates the constraint, thus preventing assignment of that route.

During operation of each dedicated fleet vehicle 110, communications circuitry such as communications circuitry 150 of FIG. 1 may provide vehicle status information, including a time at which a node has been visited, to dedicated fleet control system 104 for updating constraints and corresponding (e.g., real time) updating of routes, if desired. A suitable large M for the above time window constraint can be chosen such that a small M is avoided that might not fulfill the goal and very large M is avoided that may cause round out errors.

A maximum working time constraint may be applied that prevents, for any dedicated fleet vehicle 110, the working time for that vehicle from exceeding a predetermined threshold WT (e.g., a threshold of 14 hours or other company-based or regulatory threshold). The maximum working time constraint may help ensure that no routes or assignments are selected that cause the difference between the home depot return time and the home depot departure time for any dedicated fleet vehicle to be larger than the working time threshold WT and may be implemented numerically as follows:

$$w_{1k} - w_{2k} \leq WT, \forall k \in v_1 \quad \text{(Equation 14)}$$

Pick-up and delivery time constraints may be also applied that ensure that each shipment, whether by a dedicated fleet vehicle or a common carrier vehicle, is picked up after or at a pickup time and delivered at or before a delivery time. The pick-up and delivery time constraints may be implemented numerically as follows:

$$s_j \leq \text{deliverytime}_{i,j} \quad \text{(Equation 15)}$$

$$-s_i \leq -\text{pickup time}_{i,j} \quad \text{(Equation 16)}$$

Dedicated fleet control system 104 (e.g., server 114) may operate to distribute and route each of a plurality of shipments among the vehicles of a dedicated vehicle fleet 102 and one or more common carrier fleets 132 by computing (e.g., nearly instantaneously) an overall cost to deliver all shipments, and simultaneously evaluating each dedicated carrier constraint, for tens, hundreds, thousands, millions, tens of millions, hundreds of millions, or more combinations of assignment distributions and dedicated vehicle routes to identify a shipment plan that contains dedicated fleet routes and dedicated/common carrier assignments that provide the lowest overall cost; all without scheduling any routes that violate any of the dedicated carrier constraints. These tens, hundreds, thousands, millions, tens of millions, hundreds of millions, or more combinations of assignment distributions and dedicated vehicle routes may all be evaluated and selected automatically and with sufficient speed (e.g., within a timeframe of seconds, minutes, or hours) that tens, hundreds, thousands, or millions of shipping orders can be received, distributed, and routed without causing any delay to the commencement of shipping operations (e.g., between receiving a shipping order from a client at 5 a.m. and commencing shipping operations at 5:30 a.m. on the same day in one illustrative scenario).

In some implementations, real-time vehicle and driver status information as discussed herein may be received from communications circuitry 150 of vehicles 110 and incorporated into the tens, hundreds, thousands, millions, tens of millions, hundreds of millions, or more combinations of assignment distributions and dedicated vehicle route evaluations in real time (e.g., at a time between the first evaluated route and assignment distribution evaluation and the last evaluated route and assignment distribution evaluation of a single vehicle routing and carrier assignment operation in one illustrative example).

In this way, a dedicated fleet control system can distribute a plurality of shipments among dedicated fleet vehicles 110 and common carrier vehicles 134 for transportation of a plurality of shipments from respective pickup locations to respective delivery locations based on a determination of routes 204/208 for the dedicated fleet vehicles 110 and a concurrent minimization of an overall cost of a resulting distribution using the common carrier constraints and the dedicated carrier constraints, in which the concurrent minimization of the overall cost of the resulting distribution may include a minimization based on a cost model that excludes fixed costs for the dedicated fleet vehicles 110.

Figure 5:
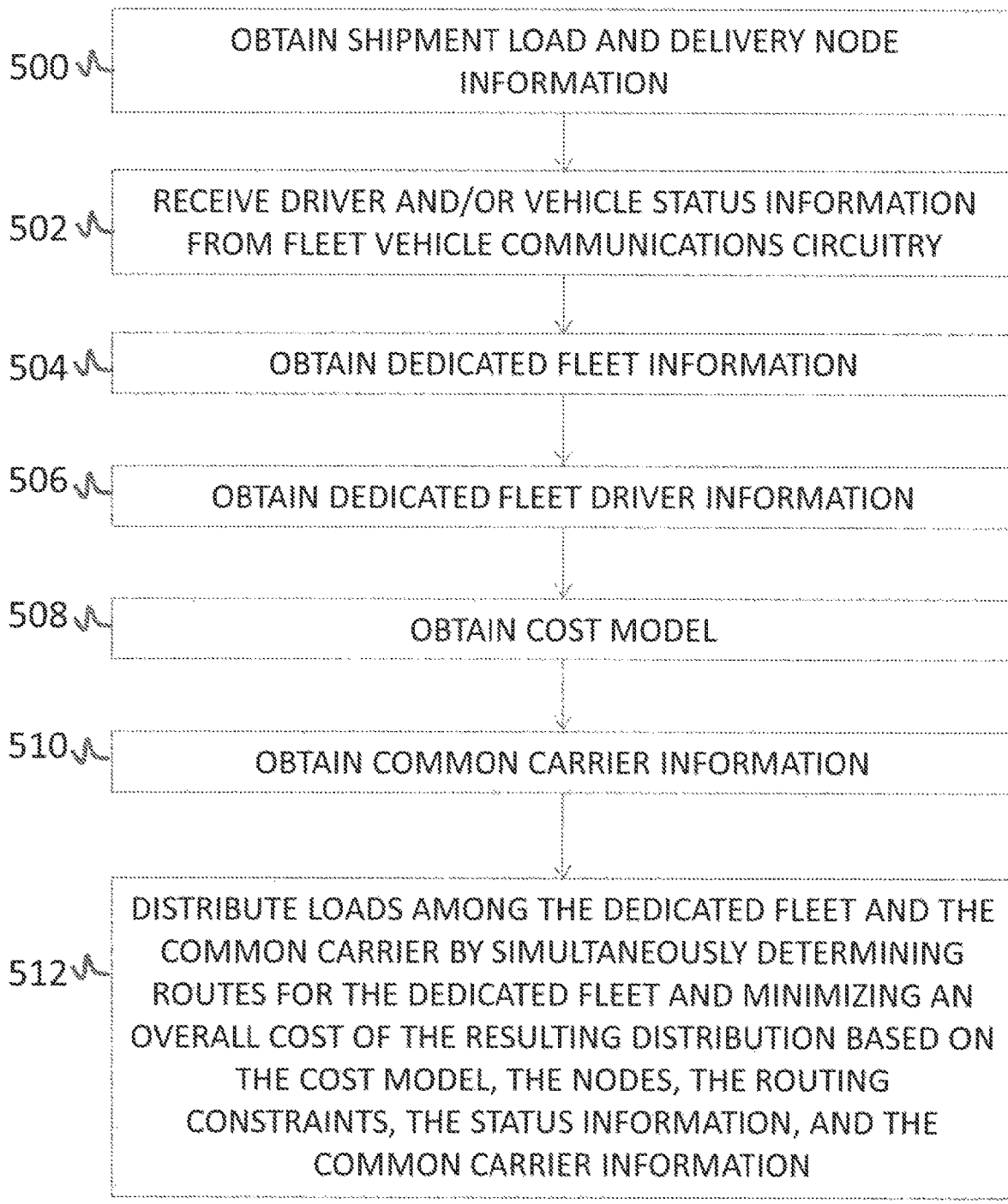
FIG. 5 is a flow diagram of another example process that may be performed for shipment distribution and vehicle fleet control in implementations of the subject technology using the system of FIG. 1.

FIG. 5 depicts a flow diagram of an example process for distributing a plurality of shipments among dedicated fleet vehicles 110 and common carrier vehicles 132 using the Model 1 implementation described above (e.g., by performing a simultaneous routing operation and minimization of the overall cost of the resulting distribution may include a minimization based on a cost model that excludes fixed costs for the dedicated fleet vehicles 110), according to various aspects of the subject technology. For explanatory purposes, the various blocks of the example process of FIG. 5 are described herein with reference to the components and/or processes described herein. The one or more of the blocks of the example process of FIG. 5 may be implemented, for example, by one or more processors, including, for example, server 114 of FIG. 1 or one or more components or processors of server 114. In some implementations, one or more of the blocks may be implemented apart from other blocks, and by one or more different processors or controllers. Further for explanatory purposes, the blocks of the example process of FIG. 5 are described as occurring in serial, or linearly. However, multiple blocks of the example process of FIG. 5 may occur in parallel. In addition, the blocks of the example process of FIG. 5 need not be performed in the order shown and/or one or more of the blocks of the example process of FIG. 5 need not be performed.

In the depicted example, at block 500, shipment load and delivery node information may be obtained (e.g., by a dedicated fleet control system 104). Shipment load information may include shipment orders received from a client or customer at dedicated fleet control system 104. Delivery node information related to nodes such as nodes 206 of FIG. 2 may include various potential or actual delivery locations and/or home depot identification for each dedicated fleet vehicle 110 as discussed herein.

At block 502, driver and/or vehicle status information from dedicated fleet vehicle communications circuitry (e.g., communications circuitry 150 of FIG. 1) may be received. Driver and/or vehicle status information may be received at the dedicated fleet control system 104. Because the driver and/or vehicle status information may be constantly changing, the vehicle communications circuitry can provide the driver and/or vehicle status information continuously or nearly continuously, in some implementations.

At block 504, dedicated fleet information such as dedicated carrier constraints as discussed herein may be obtained by the dedicated fleet control system 104. For example, one or more of the dedicated carrier constraints may be generated by server 114 of dedicated fleet control system 104 based on the ever-changing received driver and/or vehicle status information. For example, control system 104 may receive identifier of a home depot 108 for one of the dedicated fleet vehicles 110. Server 114 may then generate a constraint that the vehicle 110 depart from and return to the identified home depot within a period of time (e.g., each day). Other non-limiting examples of dedicated carrier constraints that may be generated by server 114 include the time window constraint, working time constraint, pickup and delivery time constraints, and fulfillment constraint discussed above, any or all of which may be calculated, in real time, based on the ever-changing driver and/or vehicle status information.

At block 506, dedicated fleet driver information such as a maximum working hours threshold, a maximum driving hours threshold, a current working hours value, and/or a current driving hours value may be obtained (e.g., received and/or generated) at the dedicated fleet control system 104. For example, some or all of the dedicated fleet driver information may be generated based on the received driver and/or vehicle status information. In another example, the dedicated fleet driver information may be received in real time from communications circuitry 150 of a vehicle 110 for that driver. For example, dedicated fleet control system 104 may receive a real-time current working hours total from a dedicated fleet vehicle 110 for a driver of that vehicle 110. Server 114 may determine, based on the real-time current working hours total, a remaining available hours total for the driver (e.g., an available working hours value for the driver). Server 114 may then generate a dedicated carrier constraint that prevents assigning any shipments to the driver that would cause the driver to work beyond the remaining available hours total.

At block 508, a cost model may be obtained by dedicated fleet control system 104. The cost model may be generated at dedicated fleet control system 104 to include or exclude fixed costs as described herein in accordance with various implementations as desired.

At block 510, common carrier information such as common carrier constraints as discussed herein may be obtained at the dedicated fleet control system 104 (e.g., over a network from a common carrier control system 130).

At block 512, the dedicated fleet control system (e.g., server 114 of FIG. 1) may distribute loads, each including one or more shipments from the shipment load information among the dedicated fleet 102 and the common carrier fleet 132 by simultaneously determining routes for the dedicated fleet and minimizing an overall cost of the resulting distribution based on the cost model, the nodes 206, the dedicated carrier information (e.g., dedicated carrier constraints), the status information, and the common carrier information (e.g., common carrier constraints). The cost model may, for example, include the Model 1 cost model described herein.

Any or all of the dedicated carrier information (e.g., dedicated carrier constraints), the status information, the common carrier information (e.g., common carrier constraints), and the cost model can change based on incoming, real-time, and constantly changing data. The operations of block 512 may include adjusting and determining, in real time and without human intervention the distribution of loads based on the received data with sufficient speed (e.g., within hours, minutes, or seconds) that changes in the constantly changing data do not affect the resulting distribution. In this way, a dedicated fleet control system can be provided that integrates vastly distributed and varied systems (e.g., distributed networked vehicles, servers, and other information sources) to provide a result that cannot be achieved merely by human effort.

As noted above, in various implementations, dedicated carrier vehicles may be designated to a specific home depot (see, e.g., home depots 108 of FIG. 1) in one or more distribution networks. Thus, it may be desirable to provide the ability to perform routing and carrier assignment operations for each home depot 108 separately without having to solve for the entire network of loads in some scenarios. In one implementation, delivery locations such as delivery nodes 206 may be assigned to a given home depot 108 using geographical zones such as US postal zip codes (e.g., based on a distance between the depot's zip code and zip codes in the network of potential delivery locations 206).

Zip code clustering may be performed to make the number of potential routes and carrier assignment distributions to be evaluated during each routing and assignment operation even smaller relative to unclustered assignment distribution operations. For dedicated fleet controllers that want their dedicated drivers to return home each night (e.g., controllers 104 that implement a home depot constraint on a daily basis), although the home depot constraint can be applied to account for this strategy, zip code clustering can also be used for this consideration in addition to making the number of potential evaluations smaller relative to unclustered assignment distribution operations.

The zip code assignment process may begin by clustering zip codes in the distribution network into groups around a centralized home depot 108 based on time constraints. For example, this clustering can be set to ensure that a home depot 108 is within a certain coverage driving distance to deliver to a given destination 206 and return to the home depot 108 within a given time window (e.g., within a given day), if desired. The result of this operation may form a dictionary that can be stored for future route assignment and carrier distribution runs, and thus may only be executed once for all zip codes (and not in every assignment/distribution run). The zip code dictionary may be stored at the dedicated fleet control system (e.g., in storage or memory of server 114 of FIG. 1 or other local or remote storage). During load assignment and carrier distribution operations, if both the pickup and delivery zip codes are within a cluster, the load may be qualified and considered for dedicated carrier selection. Otherwise, if at least one of the pickup or delivery zip codes is outside the cluster then the common carrier may be selected for the load. Thereby, all the loads assigned for dedicated carrier vehicles associated with a particular home depot 108 may have pickup and delivery locations clustered around, or within a range of, that home depot 108.

As previously noted, in some scenarios, carrier assignment and routing operations may, in some implementations, include fixed costs and/or multi-objective models. A fixed-cost multi-objective approach may increase the utilization of assigned fleet in comparison to single objective models (e.g., models that only consider costs, without any weighting toward utilization of dedicated carrier vehicles), but also separates the transportation mode assignment and routing decisions. In the operations described above in connection with FIG. 5 and Model 1, dedicated fleet preferences are considered in the model, which allows carrier selection to be addressed concurrent with the routing problem based on cost minimization in a single objective problem.

A comparison of dedicated versus common carrier assignments using Model 1 and two other models are now provided. In the comparison, the same dedicated carrier constraints have been considered with different objective functions in order to create a fair comparison of results. The three compared models are described below.

Model 1: The single objective model described above, which considers travel cost using the cost model described above, while excluding fixed costs, to compare carrier choices and solves routing at the same time as carrier selection.

Model 2: In the second single objective model, the fixed costs associated to each dedicated fleet truck are only added to vehicles that are selected for shipment deliveries. No additional multi-objective constraints may be added.

Model 3: Model 3 adds various different weights for dedicated/private and common carrier assets for carrier selection operations. Assigning a higher weight to dedicated fleet vehicles 110 can result in larger utilization for these vehicles 110. Weightings can be obtained by multi-criteria decision making tools like the Analytic Hierarchy Process (AHP) or based on experience. In this example, a weighted sum multi-objective model may be used by assigning a priority of 2 to dedicated fleet vehicles 110 relative to common carrier vehicles 134. As described below, Model 2 may result in underutilization of the dedicated/private fleet relative to Models 1 and 3.

An overview of the comparison of Models 1, 2, and 3 is shown in Table 3 below. Table 3 demonstrates that using Model 1 results in a much more balanced decision process for minimizing costs and utilizing the dedicated fleet. Model 1 achieves the lowest travel cost compared to the other two models and, in this example, 62.3% of loads are allocated to dedicated fleet vehicles 110. In contrast, Model 2 over-utilized common carriers, a solution that may be unacceptable to some transportation providers based on low utilization of dedicated fleet vehicles 110. The additional weighting in Model 3 for assigning routes increases utilization of dedicated fleet resources relative to Model 2, but at a higher cost relative to Model 1. Finally, Model 1 combines the decision making into a single model. It is shown that automating the process into a single optimization model may achieve efficiencies and cost reductions that multi-objective (weighting) process of Model 3 may not be able to consistently achieve, even based on expert judgment.

TABLE 3

Summary results of model comparison.

| | Model 1 | Model 2 | Model 3 |
| --- | --- | --- | --- |
| Total loads | 105 | 105 | 105 |
| Number of loads carried by common carrier | 39 | 102 | 10 |
| Number of loads carried by dedicated | 66 | 3 | 95 |
| % carried by dedicated | 62.9% | 3.0% | 90.48% |
| Overall cost | $ 81,993 | $ 96,389 | $ 83,957 |

Moreover, the comparison in Table 3 shows that even a moderate preference of 2 (weight of 0.5) in multi-objective optimization may over-utilize dedicated fleet and consequently raise overall cost. For multi-objective based operations, operators may enter preference based on their experience and, in some circumstances, may adjust the results based on expert judgment. However, this multi-objective approach is still dependent on exogenous inputs from transportation managers and may not result in an optimal solution if care is not taken.

This comparison shows that a company can save a substantial direct cost, even in only one depot per year, by using Model 1 and still gain a high number of loads carried by dedicated fleet 102. An advantage of the subject technology, e.g., Model 1, may be that a high number of loads may be assigned to dedicated fleet vehicles 110 due the cost structure (e.g., excluding fixed costs) being more representative of what is driving the actual decision in practice. Since the results of multi-objective models may incentivize post-optimization analysis, there may also some other indirect costs (e.g., engineering, time, etc.) that can be saved by utilizing Model 1.

Table 4 below shows the number of dedicated fleet vehicles 110 operated on each of eight days in a simulation based on each of the three models Model 1, Model 2, and Model 3. The maximum number of vehicles operated on any given day, based on each implementation, are also listed. In some implementations, after operating, over a period of time, a dedicated vehicle fleet 102 based on an implementation of Models 1, 2, and 3, a fleet size for a dedicated fleet 102 may be determined based on the maximum number of vehicles operated over the period of time.

TABLE 4

Number of dedicated/private vehicles utilized by day.

| Day | Model 1 | Model 2 | Model 3 |
|---|---|---|---|
| 1 | 8 | 0 | 9 |
| 2 | 7 | 0 | 10 |
| 3 | 9 | 0 | 12 |
| 4 | 4 | 0 | 17 |
| 5 | 3 | 1 | 8 |
| 6 | 7 | 0 | 12 |
| 7 | 1 | 0 | 1 |
| 8 | 4 | 0 | 4 |
| Fleet size | 9 | 1 | 17 |

FIG. 6 depicts a flow diagram of an example process for determining a dedicated fleet size based on the maximum number of vehicles operated over a period of time, according to various aspects of the subject technology. For explanatory purposes, the various blocks of the example process of FIG. 6 are described herein with reference to the components and/or processes described herein. The one or more of the blocks of the example process of FIG. 6 may be implemented, for example, by one or more processors, including, for example, server 114 of FIG. 1 or one or more components or processors of server 114. In some implementations, one or more of the blocks may be implemented apart from other blocks, and by one or more different processors or controllers. Further for explanatory purposes, the blocks of the example process of FIG. 6 are described as occurring in serial, or linearly. However, multiple blocks of the example process of FIG. 6 may occur in parallel. In addition, the blocks of the example process of FIG. 6 need not be performed in the order shown and/or one or more of the blocks of the example process of FIG. 6 need not be performed.

In particular, as shown in FIG. 6, fleet sizing operations by a dedicated fleet control system 104 may include, at block 600, distributing loads such as loads 200 and/or 200P of FIG. 2 among a dedicated fleet 102 and a common carrier 132. The loads may be distributed by simultaneously (a) determining routes such as routes 204 and 208 for the dedicated fleet 102 and (b) minimizing an overall cost of the resulting distribution based on routing constraints, common carrier information, and a cost model that excludes fixed costs for the dedicated fleet over a period of time (e.g. over a week, over nine days, over a month, over a quarter, over a year, over a shipping season, etc.).

In some implementations, at least one of the dedicated carrier constraints may be determined in real time during the distributing of the plurality of loads. The real-time determination may be performed, based on and while receiving the vehicle status information throughout the period of time. The vehicle status information may be received by the dedicated fleet server 114 from communications circuitry 150 disposed in at least one vehicle 110 of the dedicated carrier fleet 102.

In some implementations, the dedicated carrier constraints may include a constraint that each vehicle 110 of the dedicated carrier fleet 102 depart from and return to a respective home depot each 108 day within a first predetermined window of time within the period of time.

In some implementations, the dedicated carrier constraints may include a constraint that each of the plurality of loads 200/200P be picked up from the corresponding pickup location for that load and delivered to the corresponding delivery location for that load within a time second window of time within the period of time.

In some implementations, the common carrier constraints can include an indication of a number of available common carrier vehicles 134 and associated common carrier costs for the second window of time and one or more routes associated with at least one of the plurality of loads.

In the example process of FIG. 6, fleet sizing operations may include, at block 602, determining a maximum number of dedicated fleet vehicles 110 used (e.g., nine vehicles) within a predetermined window of time (e.g., on one day such as on day 3 in the example of Table 4) within the period of time (e.g., within the eight days in the example of Table 4), and at block 604, modifying the number of vehicles 110 in the dedicated fleet 102 based on the determined maximum number (e.g., by reducing the size of the dedicated fleet to 9 vehicles) for an upcoming additional period of time (e.g., for an upcoming week, an upcoming month, an upcoming quarter, an upcoming year, or an upcoming shipping season). Reducing the total number of vehicles 110 in the dedicated vehicle fleet 102 may include moving at least one of the vehicles in the dedicated vehicle fleet to a different dedicated vehicle fleet that, for example, is dedicated to a different client of the dedicated fleet control system.

The operations described above in connection with FIG. 6 may be used to determine a dedicated fleet size based on historical data. However, in some circumstances, a dedicated fleet size may be determined based on projected data.

FIG. 7 depicts a flow diagram of an example process for determining a dedicated fleet size based on projected data, according to various aspects of the subject technology. For explanatory purposes, the various blocks of the example process of FIG. 7 are described herein with reference to the components and/or processes described herein. The one or more of the blocks of the example process of FIG. 7 may be implemented, for example, by one or more processors, including, for example, server 114 of FIG. 1 or one or more components or processors of server 114. In some implementations, one or more of the blocks may be implemented apart from other blocks, and by one or more different processors or controllers. Further for explanatory purposes, the blocks of the example process of FIG. 7 are described as occurring in serial, or linearly. However, multiple blocks of the example process of FIG. 7 may occur in parallel. In addition, the blocks of the example process of FIG. 7 need not be performed in the order shown and/or one or more of the blocks of the example process of FIG. 7 need not be performed.

In the depicted example, at block 700, known or expected load information, dedicated fleet information, dedicated fleet driver information, routing constraints, and common carrier information for a projected period of time may be obtained by a dedicated fleet control system 104. The known or expected load information may include actual future shipment orders or projected shipment orders based on historical data.

At block 702, a planned distribution of the known or expected loads over the projected period of time among a dedicated fleet 102 and a common carrier 132 may be determined by the dedicated fleet control system 104 by simultaneously determining routes such as routes 204 and 208 of FIG. 2 for the dedicated fleet 102 and minimizing an overall cost of the resulting distribution based on routing constraints, common carrier information, and a cost model that includes fixed costs for the dedicated fleet 102 as described above in connection with Model 1 and FIG. 6. For example, the planned distribution may be determined by performing the minimization described above in connection with Equation 8 and applying one or more of the constraints described above in connection with Equations 9-16.

At block 704, a maximum number of dedicated fleet vehicles 110 projected to be used in one day within the projected period of time may be determined by the dedicated fleet control system 104.

At block 706, the number of vehicles 110 in the dedicated fleet 102 may be modified by the dedicated fleet control system 104 based on the determined maximum number. Modifying the number of vehicles 110 in the dedicated fleet 102 may include moving one or more vehicles 110 from the dedicated vehicle fleet 102 to another dedicated vehicle fleet (e.g., another dedicated fleet operated by the same control system 104 for another client), moving one or more vehicles 110 from another dedicated vehicle fleet to the dedicated vehicle fleet 102, purchasing additional vehicles 110 for the dedicated vehicle fleet, or selling dedicated fleet vehicles 110 (as examples).

As previously noted, a pick-up and delivery time window may be associated with each load. Providing a higher flexibility in time windows may give more freedom in scheduling the dedicated vehicle fleet. In some implementations, a flexibility factor % Flexibility may be applied to the time window as shown below:

$$\text{Deliverytime} = \text{Pickuptime} + (\text{Traveltime} + \text{Servicetime}) * (1 + \% \text{ Flexibility}) \quad \text{(Equation 17)}$$

The time window may, for example, be a maximum amount of allowable time between a pickup time and a delivery time for a particular load as described by the equation above. The flexibility factor may be applied to the maximum allowable time difference between the pickup time and the delivery time as shown. The flexibility factor may, for example, be a user-specified (e.g., customer specified) variability in the maximum allowable time difference that facilitates a reduction in size for the dedicated carrier fleet 102. In wider time frames (e.g., with a larger flexibility factor), fewer dedicated fleet vehicles 110 can be utilized to carry the same number of loads. In this condition, transportation providers such as a dedicated fleet control system 104 can dedicate fewer assets 110 to the customer without compromising quality of service.

Selecting a flexibility factor that relaxes the time window by a factor of twice the travel time may, for example, result in the number of assigned trucks 110 utilized being reduced by 30-40%. Each truck may have a cost per day for maintenance, capital investment, overhead, etc. and reducing the number of assigned trucks may save the dedicated fleet 102 in contrast to 0% flexibility. This may raise an opportunity to consider wider and more flexible time windows in dedicated fleet contracts, and shows that while the assignment of routes to common carriers 132 influences costs, there are also other opportunities to reduce cost by influencing time windows desired by customers.

The Model 1 implementation and the summary results presented above provide advantages for operation of distributed vehicle fleets as discussed below including resulting opportunities to improve the tactical decision-making process of assigning and routing different types of transportation resources on a daily basis.

As previously noted, cost models that rely on direct costs may not accurately reflect how private and dedicated transportation providers accrue costs when they are periodically assigning resources to customers or depots. However, a periodic allocation process can make the fixed cost of assigned resources almost a sunk cost that is going to be incurred regardless of the trucks actually being utilized after the assignment decision. Thus, the cost model of Model 1 of this disclosure may be a more authentic reflection of how these organizations may desire to base the dedicated resource versus common carrier assignment and routing decision in practice.

In addition to the updated cost model, the dedicated carrier constraints in Model 1 described above integrate VROs with time windows and carrier comparison into a single formulation. Both of these may be important factors to be considered for the assigned asset versus common carrier decision-making process. Thus, VROs are provided that allow comparison of assigned versus common carrier resources for specific routes within time windows in a distribution network.

The cost minimization objective function using the updated cost model of Model 1 above along with direct carrier constraints leads to the assignment and routing of assigned versus common carrier resources in a single objective model. As illustrated herein, the solutions from this single objective model are improvements upon multi-objective models that rely on manual interventions and/or expert judgment. The ability to assign carrier type and route in a single objective model thus provides a tool for a decision in which firms prioritize the utilization of increasingly scarce transportation resources at their disposal.

This tool that can be used by practitioners to assign and route a mixture of private or dedicated fleets with common carriers in a manner that reflects the decision-making criteria they value has numerous advantages. One advantage is a reduction or elimination of the gap between automated assignments and desired results that may create an incentive to manually intervene in the performance the automated assignments. In some scenarios, these manual interventions could be incentivized to be performed multiple times per day. Further, relying on decision processes that require or even incentivize manual intervention or other multi-objective processes can greatly inhibit the efficiency and many times the effectiveness of the assignment and routing process in comparison with the real-time simultaneous routing assignment and cost minimization operations described in connection with Model 1.

The Model 1 implementation provides a single objective model that considers cost in a consistent manner to real-world technological and other pressures to make the assignment and routing decisions along with a set of constraints that integrates to properly control a dedicated fleet. In addition to savings on a transportation network, this model can also save transportation managers considerable employee time that is required to manually impose preferences for assigned resources versus common carriers for shipments in a distribution network.

This disclosure provides a commercial tool that works within an existing networked transportation management system to automate and improve the assignment and routing decision for providers that utilize a mixture of assigned assets and common carriers.

As noted above, in some implementations, evaluating the potential of a backhaul on a specific route (e.g., by determining and applying a backhaul probability constraint in the model) in the assigned asset versus common carrier decision process may provide additional efficiencies in operating the dedicated fleet. As described above, a backhaul probability may be a probability, for each fleet vehicle, of carrying a load or shipment on a return portion of a route. Applying backhaul probability constraints may be implemented by storing, at the dedicated fleet control system server, a separate dictionary of backhaul probabilities by route to include in the formulation of the model.

Additionally, special equipment constraints may be applied in some implementations, for shipments that require specialized transportation assets. Additionally, the ability to pass shipments between depots in a single routing step may be provided in some implementations.

Various aspects of Model 3 described above will now be described in connection with FIGS. 8-10 in accordance with various implementations. In various implementations, a dedicated fleet control system may receive a shipment plan referencing one or more shipments associated with shipment carriers. As described above, the shipment plan may include a route for each dedicated fleet vehicle to be operated and an assignment either to a dedicated fleet vehicle 110 or a common carrier 132 for each shipment. The shipment plan may be implemented as a group of data fields pertaining to one or more shipments. The shipment plan may be stored at the dedicated fleet server 114. As an example, an initial shipment plan may be received from a transportation management application operated by a shipping carrier.

For example, the shipment carriers referenced in the shipment plan may include at least one common carrier fleet 132 and at least one dedicated fleet 102 (see, e.g., FIG. 1). The dedicated fleet 102 may be owned or operated by a shipment customer or client and may be controlled by dedicated fleet control system 104. One or more real-time constraints associated with the one or more shipment carriers included in the shipment plan may then be determined. The constraints can include one or more of: driver hours of service (e.g., based on real-time driver status information received from communications circuitry 150), dedicated fleet equipment availability (e.g., based on real-time vehicle status information received from communications circuitry 150), backhaul loads or shipments (e.g., based on real-time vehicle status information received from communications circuitry 150), the dedicated fleet's fixed cost and the dedicated fleet's shipment cost, or the common carrier fleet's shipment cost. The driver hours of service can reflect driver availability to service the shipment and may be updated (e.g., in real time) as status information is received at the dedicated fleet control system 104 from communications circuitry 150. The dedicated fleet's fixed cost may be a cost that the owner or operator of the dedicated fleet 102 pays to keep or maintain the fleet. These fixed costs may include, for example, maintenance, parking, information technology (IT), overhead, driver benefits, management team, etc. The shipment costs for the dedicated fleet 102 and the shipment costs for the common carrier fleet 132 may be based on their respective lane rates, which may include both fixed costs and variable costs. In some cases, the common carrier fleet's shipment costs may be less than the dedicated fleet's shipment costs (or vice versa). The disclosed implementations may generate an updated shipment plan based on selectively assigning the one or more shipments to the dedicated fleet 102 or the common carrier fleet 132 based on the determined constraints. Shipping customers may use the updated plan to achieve a more efficient and cost effective operation.

Figure 8:
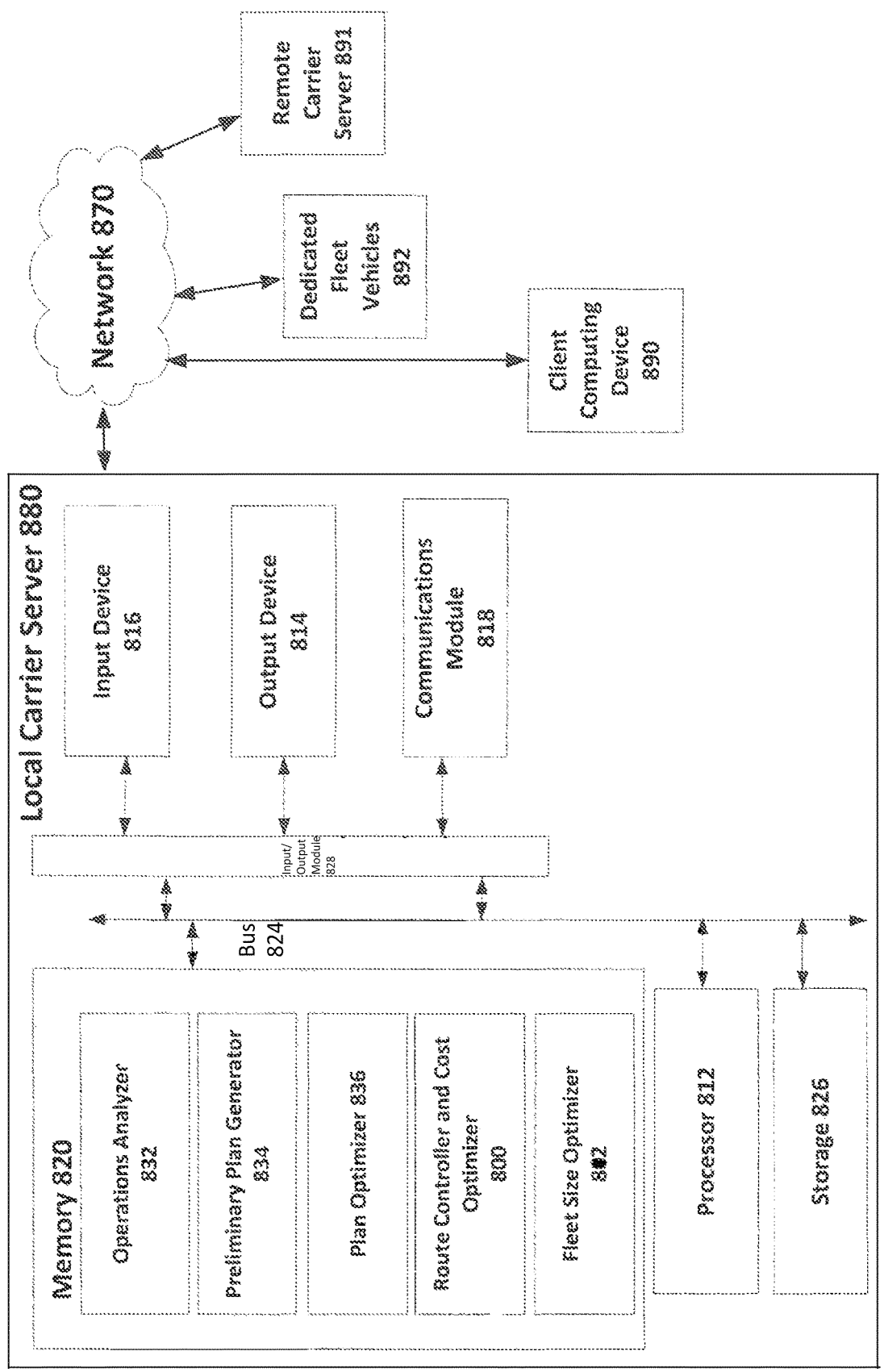
FIG. 8 is a block diagram depicting components of an example vehicle control system.

FIG. 8 is a diagram illustrating example architecture for vehicle fleet control. Local carrier server 880 (e.g., an implementation of server 114 of dedicated fleet control system 104 or an implementation of server 140 of common carrier control system 130) includes processor 812, memory 820, storage 826, bus 824, input/output module 828, input device 816, output device 814 and communications module 818 (e.g., an implementation of communications devices 116). Memory 820 may include operations analyzer 832, preliminary plan generator 834, and plan optimizer 836 in some implementations that perform operations associated with Model 3. Memory 820 may include a shipment assignment application such as route controller and cost optimizer 800 configured to simultaneously determine routes such as routes 204 and 208 of FIG. 2 for dedicated fleet vehicles 110 while distributing shipments among the dedicated fleet vehicles and a common carrier fleet 132 in accordance with implementations of Model 1. Memory 820 may also include fleet size optimizer application 802 configured to generate modifications to the size of dedicated carrier fleet 102 based on projected information and/or past fleet operations based on outputs from route controller and cost optimizer 800.

Local carrier server 880 may also communicate with remote carrier server 891 (e.g., an implementation of common carrier server 140 or server 114), dedicated fleet vehicles 892 (e.g., one or more of vehicles 110 of FIG. 1), and/or a client device such as client computing device 890. For example, shipping orders may be received at server 880 from client computing device 890. In another example, communications circuitry 150 of dedicated fleet vehicles 110 may periodically, continually, or otherwise provide vehicle and/or driver status updates to communications module 818 during delivery operations, while driving, while idling, and/or while turned off between, after, and/or before delivery operations.

For example, communications circuitry 150 of a particular dedicated fleet vehicle 110 may electronically transmit (e.g., via a cellular data network) a real-time working hours value for a driver of that vehicle to communications module 818 that indicates an amount of time that the driver has been working during a current shift, during a current week, during a current month, or during a current year. As another example, communications circuitry 150 of a particular dedicated fleet vehicle 110 may electronically transmit (e.g., via a cellular data network) a real-time driving hours value for a driver of that vehicle to communications module 818 that indicates an amount of time that the driver has been driving the vehicle during a current shift, during a current week, during a current month, or during a current year. Local carrier server 880 may, during shipment assignment operations generate dedicated carrier constraints that prevent assignments to that driver that would cause the driver's working hours and/or driving hours to exceed a threshold such as a threshold determined by a regulation such as a union regulation, a company, a state regulation, or a federal regulation.

As another example, communications circuitry 150 of a particular dedicated fleet vehicle 110 may electronically transmit (e.g., via a cellular data network) real-time vehicle status information for that vehicle to communications module 818. The real-time vehicle information may include a location of the vehicle, a speed of the vehicle, a fuel level of the vehicle, a maintenance reminder for the vehicle, a maintenance alert for the vehicle, a distance travelled during a particular period of time (e.g., a day, a driver shift, a week, a month, a year, or a vehicle lifetime), and/or other vehicle status information.

The vehicle maintenance reminder may include, for example, a service due reminder for one or more services (e.g., an oil change or inspection, a belt change or inspection, a brake fluid change or inspection, a brake pad change or inspection, a transmission fluid change or inspection, a tire rotation, change or inspection, or the like).

The vehicle maintenance alert may include a driver detected or automatically detected problem with the vehicle. For example, an automated tire-pressure monitor may determine that one or more of the vehicle's tires are low on air or have lost air pressure. Responsively, communications circuitry 150 in that vehicle may send an alert to communications module 818 that the vehicle's tires are low on air or have lost air pressure. In other examples, communications circuitry 150 may provide vehicle maintenance alerts or other alerts to communications module 818 related to events such as an air bag sensor-detected air bag deployment, an accelerometer or pressure sensor detected collision, a fuel sensor-detected fuel leak or other vehicle-sensor detected events.

Local carrier server 880 may generate various dedicated carrier constraints related to the vehicle and driver status information received by communications module 818 from communications circuitry 150 as described herein.

In some implementations, local carrier server 880 includes one or more modules for facilitating user interaction via a browser, web application or a special purpose application executing on client computing device 890. Local carrier server 880 may be implemented as a single machine with a single processor, a multi-processor machine, or a server farm including multiple machines with multiple processors (as examples). Communication module 818 can enable server 880 to send data to client computing device 890 and/or other remote systems.

Client computing device 890 can be a laptop computer, a desktop computer, a mobile phone, a personal digital assistant (PDA), a tablet computer, a netbook, a monitor with one or more processors embedded therein or coupled thereto, a physical machine, or a virtual machine. Client computing device 890 may include one or more of a keyboard, a mouse, a display, or a touch screen. Client computing device 890 can include a browser or any web application configured to display webpages or any web content. Alternatively, client computing device 890 may include special-purpose applications (e.g., mobile phone or tablet computer applications) for accessing and displaying content.

In some implementations, server 880, remote carrier server 891, dedicated fleet vehicles 892, and/or client computing device 890 can communicate with one another via network 870. Network 870 may include the Internet, an intranet, a local area network, a wide area network, a wired network, a wireless network, or a virtual private network (VPN). While only one server 880 is illustrated, the subject technology may be implemented in conjunction with any number of servers 880 and client computing devices 390. In some non-limiting implementations, a plurality of servers may implement the functions of server 380 and other components illustrated in FIG. 8.

As discussed above, memory 820 of server 880 can include operations analyzer 832, preliminary plan generator 834, plan optimizer 836. Server 880 may also communicate with other external databases such as cloud storage.

Figure 9:
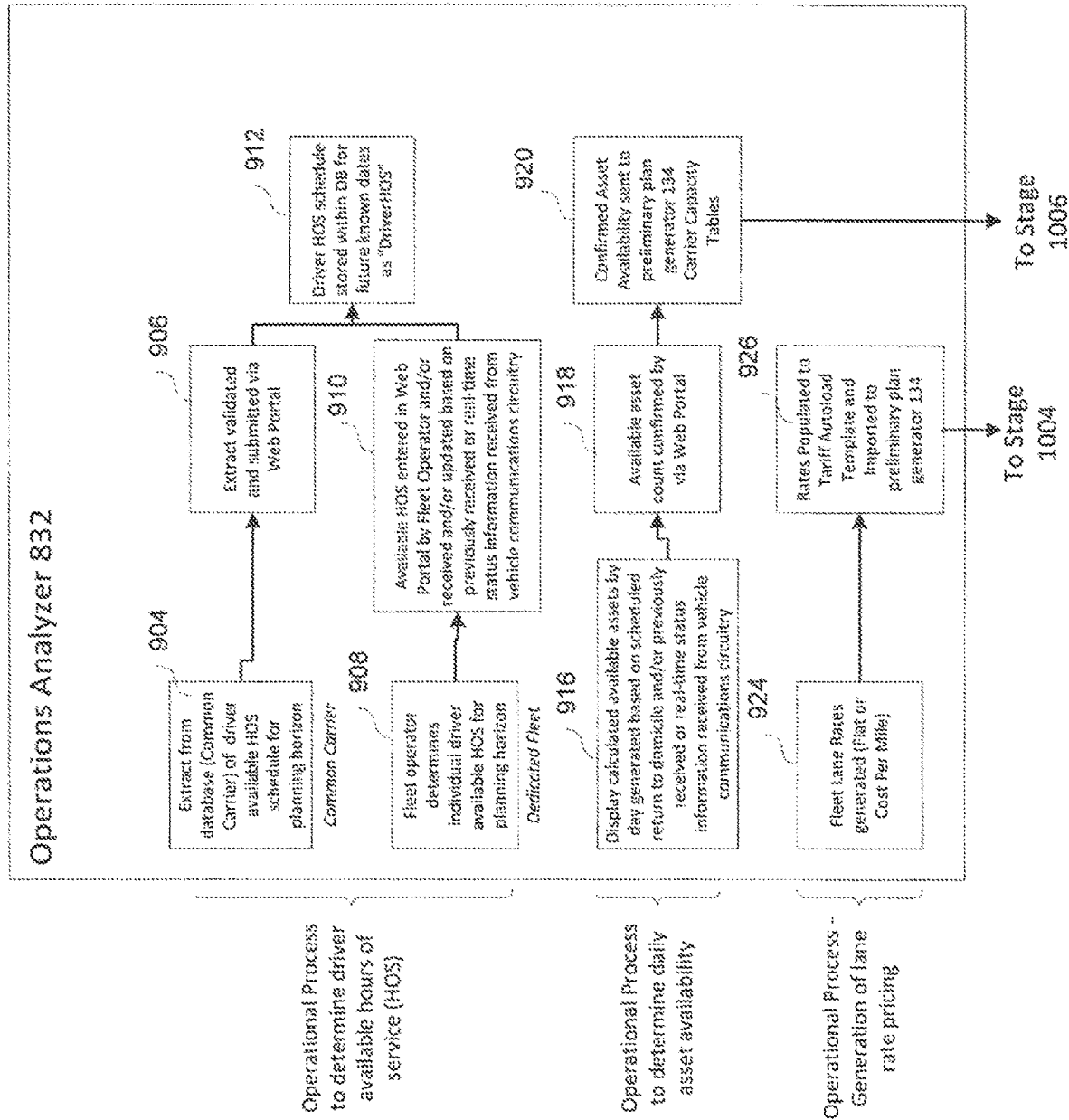
FIG. 9 is an example process that may be performed at an operations analyzer for practicing implementations of the subject technology using the example device of FIG. 8.

FIG. 9 illustrates an example view of different operational stages in operations analyzer 832 in greater detail. Stage 904 is an example operation to determine driver available hours of service (HOS). In some implementations, to determine driver HOS, operations analyzer 832 assesses both the common carrier fleet and the private or dedicated fleet. Referring to FIG. 9, a common carrier fleet operator (or a dedicated fleet operator) may determine driver HOS for the planning horizon (stage 904) and may enter the driver HOS into, for example, a web-based application or the operations analyzer 832 may extract from a fleet management system of the common carrier driver available HOS for a particular planning horizon (e.g., 1 day, 1 week, etc.) (stage 904).

The extracted data may then be validated and submitted for storage, for example, via a web-based application or a web portal associated with a transportation management application (stage 906). In parallel, a dedicated fleet operator (or a common carrier fleet operator) may determine driver HOS for the planning horizon (stage 908) and may enter the driver HOS into the web-based application and/or receive and/or update the driver HOS based on previously received or real-time status information received from vehicle communications circuitry 150 (stage 910) or extract from a Fleet Management System. Operations analyzer 832 may then store a combined driver HOS schedule into storage 826 or another remote database (stage 912). Although some of the operations described herein are described as being performed at a dedicated carrier server or at a common carrier server, it should be appreciated that, in various implementations, any of the operations described herein can be performed at the dedicated carrier server or the common carrier server as desired.

Stage 916 is an example operational process to determine daily asset (e.g., truck, vehicle, etc.) availability. In some implementations, stage 916 may be performed by operations analyzer 832 in parallel with stage 904. Stage 916 may include one or more substages. For example, in stage 916, operations analyzer 832 may display available assets for a day. The assets for a day may be generated based on a scheduled return to domicile (or a point of shipment origin) and/or based on previously received or real-time status information received from vehicle communications circuitry 150.

The available asset count may then be confirmed by the operations analyzer (stage 918). For example, the available asset count may be confirmed via the web-based application or web portal described above. The confirmed asset availability may then be sent to preliminary plan generator 834 (stage 920). As an example, the confirmed asset availability may be provided as a database table (e.g., a carrier capacity table) including one or more rows and columns identifying assets and their respective availability. The carrier capacity table may be provided by updating one or more existing tables in a database of preliminary plan generator 834 or a common database of preliminary plan generator 834 and operations analyzer 832, sending one or more new carrier capacity tables to a database of preliminary plan generator 834 or a common database of preliminary plan generator 834 and operations analyzer 832, or sending one or more files containing the carrier capacity table to the preliminary plan generator.

Stage 924 is an operational process that generates lane rate pricing. In some implementations, stage 924 may include one or more sub-stages. For example, in stage 924 operations analyzer 832 may generate fleet lane rates (e.g., a flat lane rate or a cost per mile for movement of a load along a particular route 204/208). Lane rates may be generated (e.g., in real time) based on asset availability, shipment order volume, or other external factors such as fuel prices, road conditions, etc. The generated rates can then populated to a tariff template that may be provided to or imported by the preliminary plan generator 834 for use in the calculations of the cost for various shipping plans.

Figure 10:
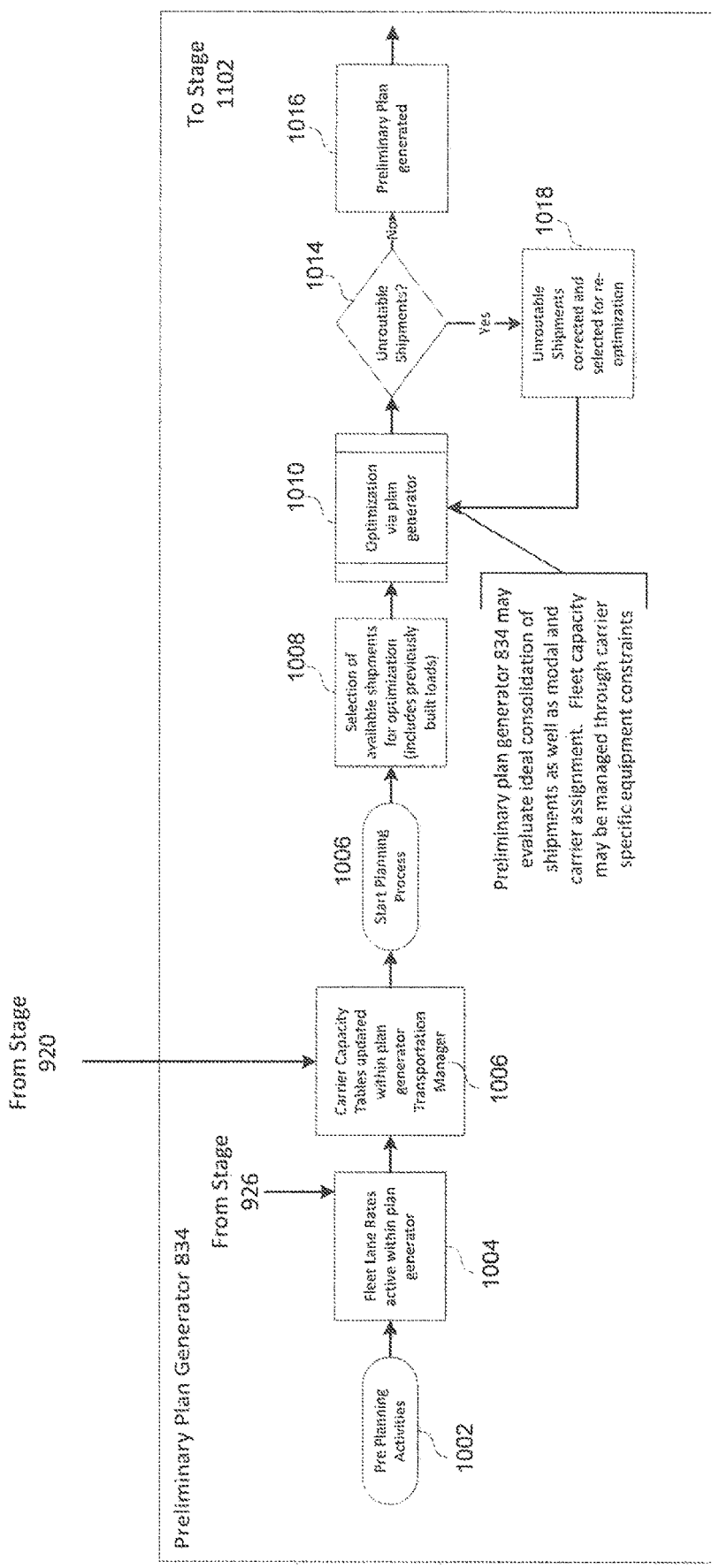
FIG. 10 is an example process that may be performed at a preliminary plan generator for practicing implementations of the subject technology using the example device of FIG. 8.

FIG. 10 illustrates preliminary plan generator 834 in greater detail according to some implementations. In some implementations, preliminary plan generator 834 may perform one or more pre-planning activities 1002 that may include receiving (or activating) one or more fleet lane rates (stage 1004) for routes such as routes 204 and 208 of FIG. 2. The fleet lane rates may be received from stage 926 of the operations analyzer 832 discussed above with reference to FIG. 8.

Carrier capacity tables (e.g., tables that summarize asset availability as described above in connection with stages 918 and 920) may be updated by the preliminary plan generator 834 based on confirmed asset availability determined by operations analyzer 832 in stage 920. Preliminary plan generator 834 may then start the planning process 1006. During the planning process 1008, preliminary plan generator 834 may select one or more shipments for optimization (stage 1008). The shipments may include previously built loads or shipments such as loads/shipments 200/200P of FIG. 2. For example, the previously built loads or shipments may be individual shipments that form a full load or groups of shipments scheduled for transportation between common locations based on a received shipment order. Preliminary plan generator 834 may then initiate an optimization process to select assets (e.g., dedicated fleet vehicles 110 and/or common carrier vehicles 134) associated with lowest lane rates (stage 1010).

In other words, preliminary plan generator 834 may, in real time, optimize a shipping plan using lane rates for routes 204/208 as a metric (stage 1010). In various implementations, preliminary plan generator 834 may evaluate, periodically or in real time, ideal consolidations of shipments as well as modal and carrier assignments. Fleet capacity considerations for the optimization may be managed through carrier specific equipment constraints (e.g., one or more constraints as described above in connection with Equations 9-16) applied within preliminary plan generator 834 (e.g., for shipping days in the future).

If it is determined, based on the applied real-time constraints, that there are un-routable shipments 200/200P (stage 1014), preliminary plan generator 834 may correct the un-routable shipments and select the corrected shipments for re-optimization (stage 1018). If it is determined that there are no un-routable shipments (stage 1014), preliminary plan generator 834 can generate a preliminary shipping plan (stage 1016). As an example, the preliminary plan may have a table format (e.g., a database table). The database table may include in one or more rows and columns of shipment origin information, customer name, customer code, city name, state name, zip code, distance between origin and destination node 206, transit time between origin and destination nodes 206, destination zip code, shipment characteristics, freight class special handling requirements, assigned carrier (e.g., dedicated carrier 102 or common carrier 132), lane rates for each available carrier, etc. The preliminary plan can indicate a mapping between orders and one or more carriers (e.g., dedicated carrier 102 or common carrier 132). The one or more carriers (e.g., dedicated carrier 102 or common carrier 132) may be selected based on the lowest lane rate while fulfilling shipment characteristics and/or various dedicated carrier constraints and common carrier constraints.

Figure 11:
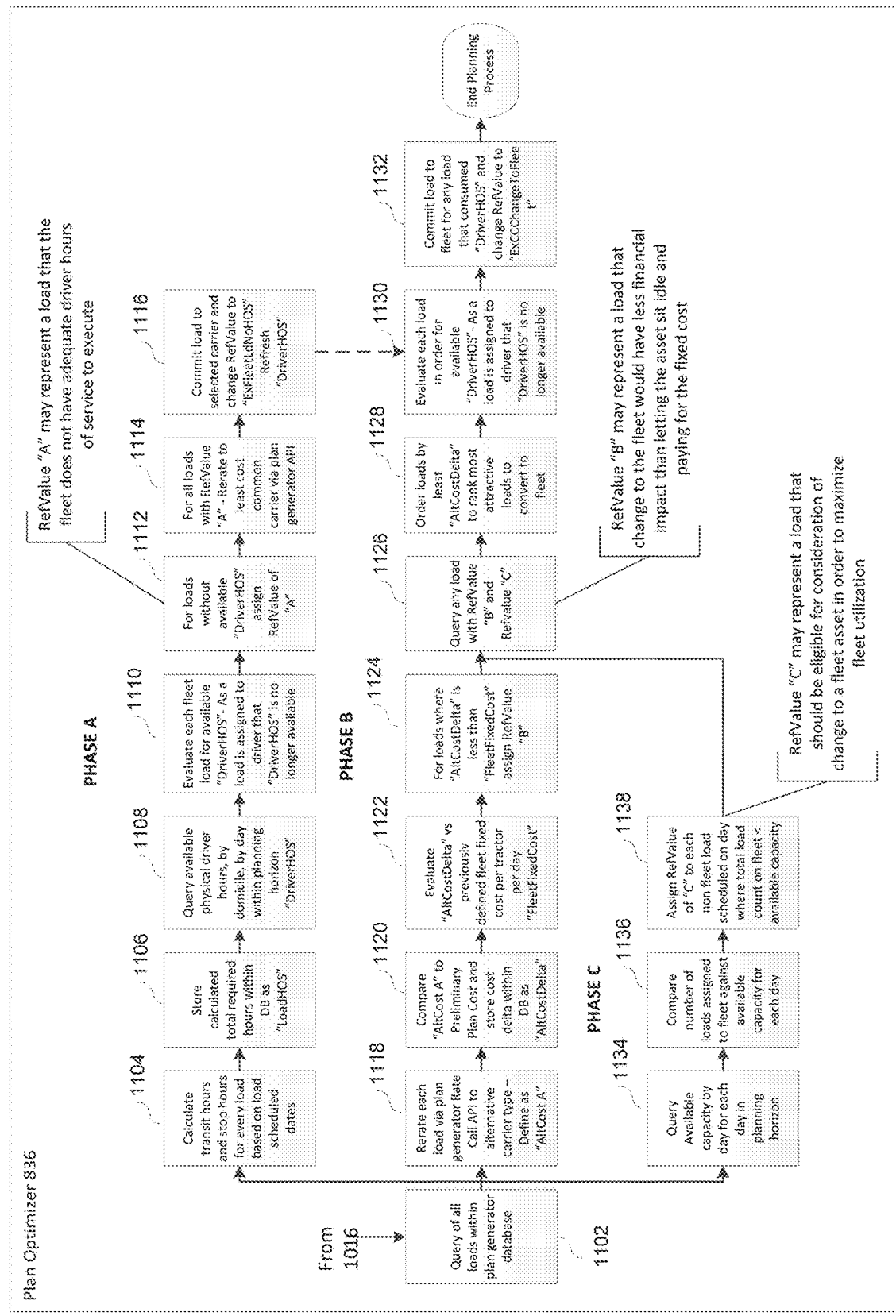
FIG. 11 is an example process that may be performed at a plan optimizer for practicing implementations of the subject technology using the example device of FIG. 8.

In some implementations as shown in FIG. 11, plan optimizer 836 receives (e.g., from stage 1016) a shipment plan referencing one or more shipments 200/200P associated with shipment carriers (e.g., dedicated carrier 102 or common carrier 132). As an example, the shipment carriers can include at least one common carrier fleet 132 and at least one dedicated fleet 102. Plan optimizer 836 can determine (e.g., in real time) one or more constraints associated with the one or more shipment carriers included in the shipment plan, where the constraints include one or more of: driver hours of service, the dedicated fleet equipment availability, backhaul loads or shipments, the dedicated fleet's fixed cost and the dedicated fleet's shipment cost, or the common carrier fleet's shipment cost, where the dedicated fleet's shipment cost and the common carrier fleet's shipment cost are based on their respective lane rates. Plan optimizer 836 may then generate, by performing some or all of the operations described below in connection with FIG. 11, an updated shipment plan based on selectively assigning the one or more shipments to the dedicated fleet or the common carrier fleet based on the determined constraints in real time while updating and/or receiving updated status information for the dedicated vehicle fleet and/or the common carrier fleet.

In some implementations and as discussed in further detail below in connection with FIG. 11, plan optimizer 836 computes a cost comparison between a shipment with a common carrier fleet 132 versus the dedicated fleet 102. For example, if the common carrier fleet rate (e.g., $1000) is less than the dedicated fleet rate (e.g. $1200), the preliminary plan generator (934) would choose the common carrier as the lowest lane rate option. Plan optimizer 836 may compute and choose the carrier with the lowest penalty cost. However, as described in further detail below in connection with FIG. 11, in some implementations, two different penalty costs may be computed and/or compared. The first penalty cost can be derived by comparing the common carrier fleet lane rate (e.g., $1000) and the dedicated fleet lane rate (e.g., $1200) to compute a first penalty cost (e.g., $200), that may be incurred if, for example, the plan optimizer assigned a particular shipment or load to the dedicated fleet. A second penalty cost may be derived by first adding the common carrier fleet lane rate (e.g., $1000) and the fixed cost portion of the dedicated fleet lane rate (e.g., $500) to derive a total cost (e.g., $1500) that may be incurred if, for example, the plan optimizer assigned the particular shipment or load to the common carrier. Then, the total cost (e.g., $1500) may be compared to the dedicated fleet lane rate (e.g., $1200) to derive a second penalty cost (e.g., $300) that may be incurred if, for example, the plan optimizer assigned the particular shipment or load to the common carrier. The plan optimizer 836 may then perform the selective assignment based on a comparison of the first penalty cost and the second penalty cost.

In some implementations, plan optimizer 836 may compare the first penalty cost to the second penalty cost and when it its determined that the first penalty cost is lower than the second penalty cost, keep the shipment assigned to the dedicated fleet. In some implementations, plan optimizer 836 may compare the first penalty cost to the second penalty cost, and when it its determined that the first penalty cost is higher than the second penalty cost, assign the shipment to the common carrier fleet.

In some implementations, plan optimizer 836 provides the updated shipment plan to a shipment tendering system. The shipment tendering system negotiates one or more tenders to assign the shipment to the common carrier. Plan optimizer 836 may also provide the updated shipment plan to a fleet management system for assignment to the dedicated fleet. Plan optimizer 836 or operations analyzer 832 may then execute the updated shipment plan, where the execution includes transmitting one or more notifications to drivers, the notifications including instructions regarding the shipments.

FIG. 11 illustrates plan optimizer 836 in greater detail. In some implementations, plan optimizer 836 may operate in three parallel phases A, B and C. For example, operations associated with each of phases A, B, and C may be performed concurrently such that feedback from the operations of one or more of phases A, B, and C may be provided into the operations of any other of the phases A, B, and C to inform those operations and modify, in real time, the assignments between the dedicated and common carriers. The phases A, B, and C, and/or their component parts may be performed in real time and without user intervention. This parallel operation can be particularly useful in incorporating real-time information received from one or more of the dedicated fleet vehicles 110 during the operations of phases A, B, and C.

In some implementations, and as an example overall operation, in phase A plan optimizer 836 reviews shipments that have been assigned to a fleet and reviews fleet hours of service (e.g., based on real-time updated vehicle status information received from communications circuitry 150 of each of vehicles 110) to ensure that loads are not overcommitted with regard to driver HOS even as the driver HOS evolves during shipping operations. In some implementations, phase B determines whether a particular shipment can stay assigned to a dedicated fleet or whether it may need to be shifted to a common carrier fleet (or vice versa). Phase C makes a determination of what assets (e.g., vehicles) are available (e.g., based on real-time updated vehicle status information received from communications circuitry 150 of each of vehicles 110) and provides the determination to Phase B. Real-time updated information (e.g., vehicle and/or driver status information) provided to server 114 from communications circuitry 150 of each of dedicated fleet vehicles 110) can be incorporated in real time and without user intervention, during the operations of any or all of phases A, B, and/or C.

In some implementations, plan optimizer 836 may query, receive or read the preliminary plan shipments and assets generated by preliminary plan generator 834 (stage 1102). In Phase A, which begins with stage 1104, plan optimizer 836 calculates transit hours and stop hours for each load or shipment based on shipment scheduled dates (stage 1104). Plan optimizer 836 may then store the calculated total in a database (e.g., storage 826) as, for example, load hours of service (HOS) (stage 1106). Driver available hours of service by domicile, or by day may be queried (stage 1108) within a planning horizon (stage 1110) or may be received, in real time from communications circuitry 150 of each of vehicles 110. For loads or shipments without available driver HOS a reference value of A may be assigned (stage 1112). The reference value A may represent a load that a fleet does not have adequate hours of service to execute. Then, for all loads with a reference value A, plan optimizer 836 may rerate the loads to a lowest or least cost carrier via an application programming interface (API) associated with the preliminary plan generator 834 (stage 1114). Plan optimizer 836 may then commit the load to the lowest or least cost carrier (stage 1116). Additionally, plan optimizer 836 may change the reference value of A (assigned in stage 1112) to a value that may be "ExFleetLdNoHOS" and may also refresh a value of driver HOS. One or more or all of the foregoing operations may be performed without user intervention in real time with respect to each other and other phases or component parts thereof.

In Phase B, plan optimizer 836 rerates each load via a preliminary plan generator 834 API to an alternative carrier type (or moved from dedicated fleet to common carrier or vice versa) (stage 1118). As an illustrative example, this rerated cost may be defined as "AltCostA." In stage 1120, plan optimizer 836 compares "AltCostA" to an analogous cost generated by preliminary plan generator 834 and stores a difference (or delta) between these costs. As an example, the difference value may be defined as "AltCostDelta." In stage 1122, plan optimizer 836 may evaluate the previously computed "AltCostDelta" to a previously defined fleet fixed cost per vehicle asset per day (e.g., "FleetFixedCost"). Then, for loads or shipments where "AltCostDelta" is less than "FleetFixedCost," plan optimizer 836 may assign a reference value of "B" (stage 1124).

Reference value B may represent a load that when assigned to a dedicated fleet would have less financial impact than allowing the dedicated fleet asset to sit idle and paying for a fixed cost associated with the dedicated fleet asset. Reference value B may sometimes be assigned based at least in part on real-time update information from communications circuitry 150 of each of vehicles 110 related to dedicated fleet driver and/or vehicle availability. Plan optimizer 836 may then query any load that is referenced by a reference value or "B" and "C" (stage 1126). In stage 1128, plan optimizer 836 may order loads by a least value of "AltCostDelta."

In this way, plan optimizer 836 generates a ranking of loads or shipments that may be moved from a dedicated fleet to a common carrier fleet based in part, for example, on real-time updated status information from communications circuitry 150 of each of vehicles 110. Plan optimizer 836 may proceed by evaluating each ranked load with consideration to real-time updated driver HOS to prevent a load from being assigned to a driver without HOS available (stage 1130). Stage 1130 may also receive input from stage 1116 from Phase A of plan optimizer 836. Plan optimizer 836 may then commit each load to a fleet that have driver HOS available and change the reference value from "B" to "ExCCChangeToFleet" (stage 1130) and the planning process may end (stage 1132). One or more or all of the foregoing operations may be performed without user intervention in real time with respect to each other and other phases or component parts thereof.

In Phase C, plan optimizer 836 may query available capacity of a dedicated fleet by day for each day for the planning horizon and/or may receive real-time updated vehicle and driver status information from communications circuitry 150 of each of vehicles 110 (stage 1134). Plan optimizer 836 may then compare a number of loads assigned to a dedicated fleet against the fleet's available capacity for each day as determined based on the real-time updated vehicle and driver status information (stage 1136). Plan optimizer 836 may then assign a reference value of "C" to each non-fleet load scheduled on a day where a total load count on a fleet may be less than an available capacity (stage 1138). Reference value C may reference a load that may be eligible for consideration of change to a dedicated fleet asset in order to maximize dedicated fleet performance. In some implementations, the output of stage 1138 may be provided by plan optimizer 836 to stage 1126 of phase B as a part of the planning process. One or more or all of the foregoing operations may be performed without user intervention in real time with respect to each other and other phases or component parts thereof.

In some implementations, storage 826 may communicate with plan optimizer 836. Storage 826 may also communicate with preliminary plan generator 834 and operations analyzer 832. In some implementations, plan optimizer 836 may store data gathered during the optimization process performed by plan optimizer 836. This data may include, but is not limited to (i) Daily Driver Hours of Service (e.g., the number of hours of service provided by each driver of each vehicle on each day as determined from the real-time updated vehicle and driver status information), (ii) Load—Hours of Service Required (e.g., a number of hours a driver spent picking up and delivering each load), (iii) Alternative cost solution (common carrier or dedicated fleet) for every load (e.g., a cost for each load had the other of the common carrier or dedicated fleet been used instead of the one of the common carrier or dedicated fleet that was actually used), (iv) Difference of cost between common carrier and fleet for all loads (e.g., a cost difference between use of the common carrier or dedicated fleet for each load regardless of which of the common carrier or dedicated fleet was actually used), (v) Total available physical assets by day by domicile (e.g., a total number of dedicated fleet vehicles that was available on each day during a period of time, categorized by home depot), (vi) Designation of loads that were changed from common carrier to fleet (e.g., a flag value for each load that was changed from an original assignment), (vii) Designation of loads that did not have enough available hours of service to execute to fleet (e.g., a flag value for each load that was not able to be assigned to the dedicated fleet due to a lack of available hours of service), and/or (viii) Designation of loads in which the penalty cost between common carrier and fleet is less than the penalty cost of the common carrier cost plus the fixed cost of vehicle per day compared to dedicated fleet cost (e.g., a flag value for each load for which the penalty cost between common carrier and fleet is less than the penalty cost of the common carrier cost plus the fixed cost of vehicle per day compared to dedicated fleet cost).

In some implementations, server 880 may generate new analytics data based on an analysis of stored historical data. The analytics may be used to inform future fleet sizing decisions and/or to generate additional dedicated fleet constraints that can be applied to generate a more desirable distribution of assignments. The new analytics data may include (a) Daily Driver Utilization (e.g., one or more summary charts or metric values describing the utilization of each driver each day), (b) Daily Asset Utilization (e.g., one or more summary charts or metric values describing the utilization of each vehicle each day), (c) Savings—Generated by dedicated fleet or common carrier (e.g., one or more summary charts or metric values describing the cost savings generated by the use of the dedicated fleet or the common carrier fleet over a period of time), (d) Lost opportunity of under-utilization of fleet (e.g., one or more summary charts or metric values describing a cost associated with dedicated fleet vehicles that were not operated within a given period of time), (e) Measurement of baseline engineering against actual execution (e.g., one or more summary charts or metric values describing a comparison of the generated shipment assignments and/or routes to actual shipment execution assignments and/or routes), (f) Future lane opportunity for expansion of the fleet (e.g., one or more summary charts or metric values describing unused routes for a period of time that can be used by the dedicated fleet, such as routes that are often assigned to a common carrier fleet for a particular client), and/or (g) Output for Visual Representation (e.g., one or more charts, maps, and/or metric values that visually describe the operation of the dedicated fleet and/or the common carrier fleet or the movement of shipments or costs associated therewith over a period of time).

In various implementations, a method may include receiving, via an electronic network such as network 870 of FIG. 8 by one or more computing devices (e.g., server 114) operated at a dedicated carrier, a shipment plan referencing one or more shipments associated with shipment carriers. The shipment carriers may include at least one common carrier fleet 132 operated by a common carrier and at least one dedicated fleet 102 operated by the dedicated carrier. The shipment plan may include respective lane rates for the common carrier fleet 132 and the dedicated fleet 102 as described above in connection with, for example, stages 924 and 926 of FIG. 9. The method may also include determining, by the one or more computing devices (e.g., server 114), one or more real-time constraints (e.g., one or more dedicated carrier constraints as described above in connection with Equations 1-9) associated with the one or more shipment carriers included in the shipment plan. The method may also include selectively assigning, by the one or more computing devices in real-time with the determining and without user intervention, the one or more shipments to the dedicated fleet 102 or the common carrier fleet 132 based on the determined one or more real-time constraints and based on the dedicated fleet's shipment cost, the dedicated fleet's fixed cost for operating the dedicated fleet 102, and the common carrier fleet's shipment cost. The dedicated fleet's shipment cost and the common carrier fleet's shipment cost may be based on their respective lane rates. The method may also include generating in real time, from the received shipment plan without user intervention, an updated shipment plan based on the selective assignment of the one or more shipments and providing, via the electronic network without user intervention, the updated shipment plan to a fleet management system.

In some implementations, determining the real-time constraints may include extracting, from one or more fleet management systems without user intervention, real-time parameters such as driver hours of service (HOS) for the at least one common carrier fleet 132 and the at least one dedicated fleet 102 for a planning horizon associated with the one or more shipments. Determining the real-time constrains may also include determining, in response to the extracting without user intervention, whether the driver HOS for at least one of the shipment carriers is overcommitted. The assigning of the one or more shipments may be based on whether the driver HOS for the at least one of the shipment carriers is overcommitted.

In some implementations, the method may also include executing, by the one or more computing devices (e.g., server 114) without user intervention, the updated shipment plan, where the execution includes transmitting one or more notifications to drivers, the notifications including instructions (e.g., routes such as routes 204 or 208) regarding the one or more shipments.

Returning to FIG. 8, in certain aspects, server 880 may be implemented using hardware or a combination of software and hardware, either in a dedicated server, or integrated into another entity, or distributed across multiple entities.

Server 880 includes a bus 824 or other communication mechanism for communicating information, and processor 812 coupled with bus 824 for processing information. Processor 812 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Server 880 can include, in addition to hardware, code that creates an execution environment for the computer program in question, e.g., code that constitutes processor firmware, a protocol stack, a database management system, an operating system, or a combination of one or more of them stored in memory 820. Memory 820 may include Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 824 for storing information and instructions to be executed by processor 812. The processor 812 and the memory 820 can be supplemented by, or incorporated in, special purpose logic circuitry.

The instructions may be stored in the memory 820 and implemented in one or more computer program products, i.e., one or more modules of computer program instructions encoded on a computer readable medium for execution by, or to control the operation of, the server 880, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 820 may also be used for storing temporary variable or other intermediate information during execution of instructions to be executed by processor 812.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Server 880 further includes a data storage device 826 such as a magnetic disk or optical disk, coupled to bus 824 for storing information and instructions. Server 880 may be coupled via input/output module 828 to various devices. The input/output module 828 can be any input/output module. Example input/output modules 828 include data ports such as USB ports. The input/output module 828 is configured to connect to a communications module 818. Example communications modules 818 include networking interface cards, such as Ethernet cards and modems. In certain aspects, the input/output module 828 is configured to connect to a plurality of devices, such as an input device 816 and/or an output device 814. Example input devices 816 include a keyboard and a pointing device, e.g., a mouse or a trackball, by which a user can provide input to the server 880. Other kinds of input devices 816 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 814 include display devices, such as a LED (light emitting diode), CRT (cathode ray tube), or LCD (liquid crystal display) screen, for displaying information to the user.

According to one aspect of the present disclosure, server 880 can be implemented using a server 880 in response to processor 812 executing one or more sequences of one or more instructions contained in memory 820. Such instructions may be read into memory 820 from another machine-readable medium, such as data storage device 826. Execution of the sequences of instructions contained in main memory 820 causes processor 812 to perform the process blocks described herein. One or more processors in a multi-processing arrangement may also be employed to execute the sequences of instructions contained in memory 820. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 870) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Server 880 can be, for example, and without limitation, a desktop computer, laptop computer, or tablet computer. Server 880 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 812 for execution. Such a medium may take many forms, including, but not limited to, non-volatile media and volatile media. Non-volatile media include, for example, optical disks, magnetic disks, or flash memory, such as data storage device 826. Volatile media include dynamic memory, such as memory 820. Transmission media include coaxial cables, copper wire, and fiber optics, including the wires that form bus 824. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate aspects can also be implemented in combination in a single aspect. Conversely, various features that are described in the context of a single aspects can also be implemented in multiple aspects separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method comprising:
identifying, by a dedicated fleet control server associated with a dedicated carrier, one or more shipments for assignment to a common carrier fleet or a dedicated carrier fleet;
receiving, by the dedicated fleet control server and from a common carrier fleet server, a one or more common carrier constraints including an indication of at least one available common carrier vehicle for one or more predetermined windows of time, and costs for shipping the one or more shipments with the at least one available common carrier vehicle along one or more routes during the one or more predetermined windows of time;
receiving, by the dedicated fleet control server and from communications circuitry disposed in one or more vehicles of the dedicated carrier fleet, real-time vehicle status information for the one or more predetermined windows of time, wherein:
the real-time vehicle status information comprises driver status information, including driver hours of service based on an amount time that a driver has been operating the respective vehicle, and the driver status information is received in part from an operator device in response to the operator device being within a proximity of a cab of the respective vehicle, causing the operator device to communicatively couple to, based on the proximity, the communications circuitry disposed in the respective vehicle;

determining, by the dedicated fleet control server in real time while receiving the real-time vehicle status information from the communications circuitry, one or more dedicated carrier constraints for the one or more predetermined windows of time based on the received real-time vehicle status information;

in response to a received first change to the one or more common carrier constraints, updating, by the dedicated fleet control server and based on the received first change, an assignment of the one or more shipments to one of the dedicated carrier fleet or the common carrier fleet; and in response to a received second change to the real-time vehicle status information, updating, by the dedicated fleet control server and based on the received second change, the assignment of the one or more shipments to one of the dedicated carrier fleet or the common carrier fleet based on the determined one or more dedicated carrier constraints and the received real-time vehicle status information.

2. The computer-implemented method of claim 1, wherein determining the one or more dedicated carrier constraints comprises:

receiving a real-time current working hours total for a driver of the one or more vehicles of the dedicated carrier fleet;

determining, based on the real-time current working hours total and a working hours limit, a remaining available hours total for the driver; and generating at least one of the one or more dedicated carrier constraints based on the determined remaining available hours total, such that the at least one of the one or more dedicated carrier constraints prevents assignment of any of the one or more shipments to the driver, within the one or more predetermined windows of time, that would cause the driver to work beyond the remaining available hours total.

3. The computer-implemented method of claim 2, wherein selectively assigning the one or more shipments includes assigning, to another driver of the dedicated carrier fleet or to the common carrier fleet, any of the one or more shipments that would cause the driver to work beyond the remaining available hours total.

4. The computer-implemented method of claim 1, wherein the real-time vehicle status information for a particular dedicated fleet vehicle comprises a maintenance notice for that vehicle during one of the one or more predetermined windows of time, and wherein selectively assigning the one or more shipments comprises preventing assignment of shipments to that vehicle during the one of the one or more predetermined windows of time until the maintenance notice has been cleared.

5. The computer-implemented method of claim 1, wherein the real-time vehicle status information for each vehicle of the dedicated carrier fleet includes a real-time available driving hours value for a driver of that vehicle within the one or more predetermined windows of time, and wherein selectively assigning the one or more shipments comprises selecting only dedicated vehicle fleet drivers with real-time available driving hours values that satisfy a predetermined threshold.

6. The computer-implemented method of claim 1, further comprising:

generating a shipment plan based on the assignment;

providing at least a portion of the shipment plan to the common carrier fleet server for distribution of a first portion of the one or more shipments to the common carrier fleet; and providing assignments from a second portion of the shipping plan to the communications circuitry disposed in one or more of the vehicles of the dedicated carrier fleet, the second portion of the shipping plan including assignments for a second portion of the one or more shipments.

7. The method of claim 6, wherein providing the assignments to the communications circuitry disposed in one or more of the vehicles of the dedicated carrier fleet comprises pushing a travel route with shipping pickup and delivery instructions from the dedicated fleet control server to each vehicle of the at least some of the vehicles of the dedicated carrier fleet.

8. The method of claim 6, further comprising updating the shipment plan based on selectively assigning the one or more shipments to one of the dedicated carrier fleet or the common carrier fleet.

9. The computer-implemented method of claim 1, wherein the one or more dedicated carrier constraints are determined based at least in part on driver status information.

10. The method of claim 1, wherein the one or more predetermined windows of time comprises a portion of a day.

11. A system, comprising:

one or more processors; and a non-transitory computer readable medium having instructions stored thereon that, when executed by the one or more processors, cause the one or more processors to perform operations comprising:

identifying one or more shipments for assignment to a common carrier fleet or a dedicated carrier fleet;

receiving, from a common carrier fleet server, one or more common carrier constraints including an indication of at least one available common carrier vehicle for one or more predetermined windows of time, and costs for shipping the one or more shipments with the at least one available common carrier vehicle along one or more routes during the one or more predetermined windows of time;

receiving, from communications circuitry disposed in one or more vehicles of the dedicated carrier fleet, real-time vehicle status information for the one or more predetermined windows of time, wherein:

the real-time vehicle status information comprises driver status information, including driver hours of service based on an amount time that a driver has been operating the respective vehicle, and the driver status information is received in part from an operator device in response to the operator device being within a proximity of a cab of the respective vehicle, causing the operator device to communicatively couple to, based on the proximity, the communications circuitry disposed in the respective vehicle;

determining, in real time while receiving the real-time vehicle status information from the communications circuitry, one or more dedicated carrier constraints for the one or more predetermined windows of time based on the received real-time vehicle status information;

receiving a change to at least one of i) the one or more common carrier constraints from the common carrier fleet server or ii) the real-time vehicle status information from the communication circuitry;

determining, based on the change, a minimalization of a cost model based on the change; and selectively assigning, based on the change, the one or more shipments to one of the dedicated carrier fleet or the common carrier fleet based on the determined one or more dedicated carrier constraints and the received one or more common carrier constraints; and distributing, based on the selective assigning and the minimalization of the cost model, the one or more shipments.

12. The system of claim 11, wherein the operations further comprise:

receiving a real-time current working hours total for a driver of the one or more vehicles of the dedicated carrier fleet;

determining, based on the real-time current working hours total and a working hours limit, a remaining available hours total for the driver; and generating at least one of the one or more dedicated carrier constraints based on the determined remaining available hours total, such that the at least one of the one or more dedicated carrier constraints prevents assignment of any of the one or more shipments to the driver, within the one or more predetermined windows of time, that would cause the driver to work beyond the remaining available hours total.

13. The system of claim 12, wherein selectively assigning the one or more shipments includes assigning, to another driver of the dedicated carrier fleet or to the common carrier fleet, any of the one or more shipments that would cause the driver to work beyond the remaining available hours total.

14. The system of claim 11, wherein the one or more dedicated carrier constraints are determined based at least in part on driver status information.

15. The system of claim 11, wherein the plurality of common carrier constraints further includes a cost per weight of the one or more shipments.

16. The system of claim 11, further comprising:

identifying a home depot for at least one vehicle of the dedicated carrier fleet; and generating a dedicated carrier constraint that ensures that the at least one vehicle departs from and returns to the home depot associated with the identifier each day.

* * * * *

UNITED STATES PATENT AND TRADEMARK OFFICE
CERTIFICATE OF CORRECTION

| | | |
|---|---|---|
| PATENT NO. | : 12,093,882 B2 | Page 1 of 1 |
| APPLICATION NO. | : 17/348689 | |
| DATED | : September 17, 2024 | |
| INVENTOR(S) | : Christopher Lee Scharaswak et al. | |

It is certified that error appears in the above-identified patent and that said Letters Patent is hereby corrected as shown below:

On the Title Page

Under (72) Inventors: Replace "Laurenceville, GA (US)" with --Lawrenceville, GA (US)--;

In the Claims

Column 46; Line 53 (Claim 1): Replace "server, a one or more" with --server, one or more--.

Signed and Sealed this
Second Day of December, 2025

John A. Squires
*Director of the United States Patent and Trademark Office*